US010114539B2

(12) United States Patent
Kim et al.

(10) Patent No.: US 10,114,539 B2
(45) Date of Patent: Oct. 30, 2018

(54) SYSTEM AND METHOD FOR PROVIDING FEEDBACK ASSOCIATED WITH E-BOOK IN MOBILE DEVICE

(71) Applicant: Samsung Electronics Co. Ltd., Suwon-si, Gyeonggi-do (KR)

(72) Inventors: Youngri Kim, Suwon-si (KR); Sanghyup Lee, Suwon-si (KR); Shinjun Lee, Yongin-si (KR); Juyoun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 579 days.

(21) Appl. No.: 13/860,024

(22) Filed: Apr. 10, 2013

(65) Prior Publication Data

US 2013/0268858 A1    Oct. 10, 2013

(30) Foreign Application Priority Data

Apr. 10, 2012 (KR) .................. 10-2012-0037543

(51) Int. Cl.
*G06F 3/0488* (2013.01)
*G06F 3/0487* (2013.01)
*G06F 3/01* (2006.01)
*G06F 3/0483* (2013.01)
*G06F 3/0346* (2013.01)

(52) U.S. Cl.
CPC ............ *G06F 3/0488* (2013.01); *G06F 3/016* (2013.01); *G06F 3/0346* (2013.01); *G06F 3/0483* (2013.01); *G06F 3/0487* (2013.01); *G06F 3/04883* (2013.01)

(58) Field of Classification Search
CPC .. G06F 3/0414; G06F 3/0483; G06F 3/04883; G06F 3/04847; G06F 3/0488; G06F 3/016; G06F 3/0346; G06F 3/0487
USPC ....... 345/156–174, 659, 419, 473, 426, 619; 715/255, 273, 776
See application file for complete search history.

(56) References Cited

U.S. PATENT DOCUMENTS

| 5,463,725 | A  | * | 10/1995 | Henckel et al. ............... 715/776 |
| 8,018,431 | B1 | * | 9/2011  | Zehr et al. .................... 345/156 |
| 2001/0024195 | A1 | * | 9/2001  | Hayakawa .................... 345/173 |
| 2003/0200858 | A1 | * | 10/2003 | Xie .................................. 84/609 |
| 2004/0080541 | A1 |   | 4/2004  | Saiga et al. |
| 2004/0201569 | A1 | * | 10/2004 | Seet et al. ...................... 345/156 |
| 2010/0188327 | A1 | * | 7/2010  | Frid et al. ...................... 345/156 |
| 2010/0278453 | A1 | * | 11/2010 | King .............................. 382/321 |
| 2011/0050592 | A1 | * | 3/2011  | Kim et al. ..................... 345/173 |
| 2012/0001923 | A1 | * | 1/2012  | Weinzimmer et al. ....... 345/473 |
| 2012/0084634 | A1 | * | 4/2012  | Wong et al. .................. 715/233 |

(Continued)

FOREIGN PATENT DOCUMENTS

| KR | 10-0539032 B1 | 12/2005 |
| KR | 10-2011-0026176 A | 3/2011 |

*Primary Examiner* — Abhishek Sarma
(74) *Attorney, Agent, or Firm* — Jefferson IP Law, LLP

(57) ABSTRACT

A system and method that provides various types of feedback associated with an e-book in a mobile device with an e-book reader function are provided. The method includes displaying a page of an e-book on a touch screen of the mobile device, detecting a touch on the page, detecting a movement of the touch, beginning a page turning operation in response to the movement of the touch, and providing audio feedback based on a history corresponding to the page, according to the page turning operation.

20 Claims, 23 Drawing Sheets

(56) References Cited

U.S. PATENT DOCUMENTS

2012/0113023 A1* 5/2012 Koch et al. .................. 345/173
2013/0021281 A1* 1/2013 Tse ........................ G06F 3/0425
                   345/173

* cited by examiner

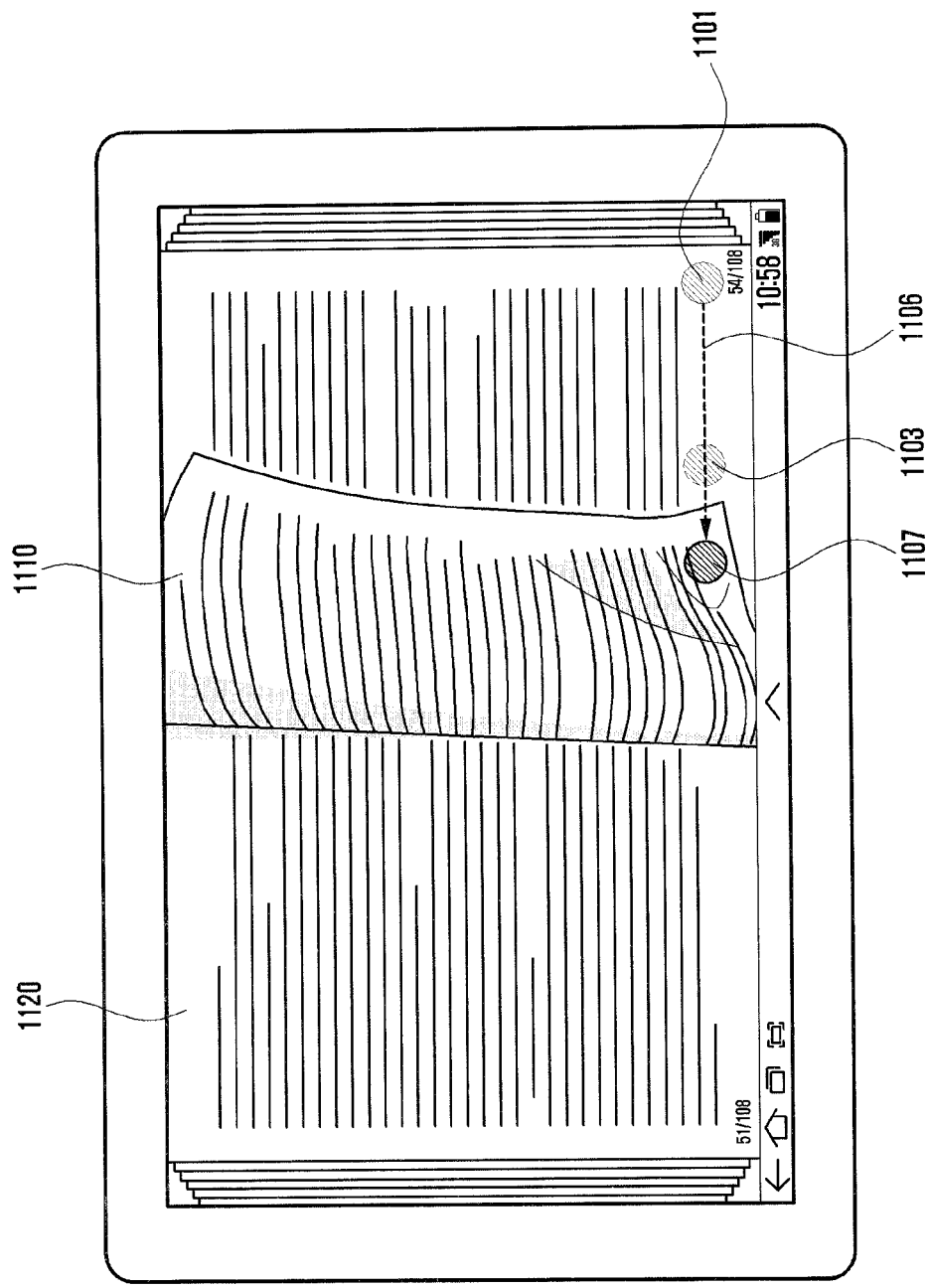

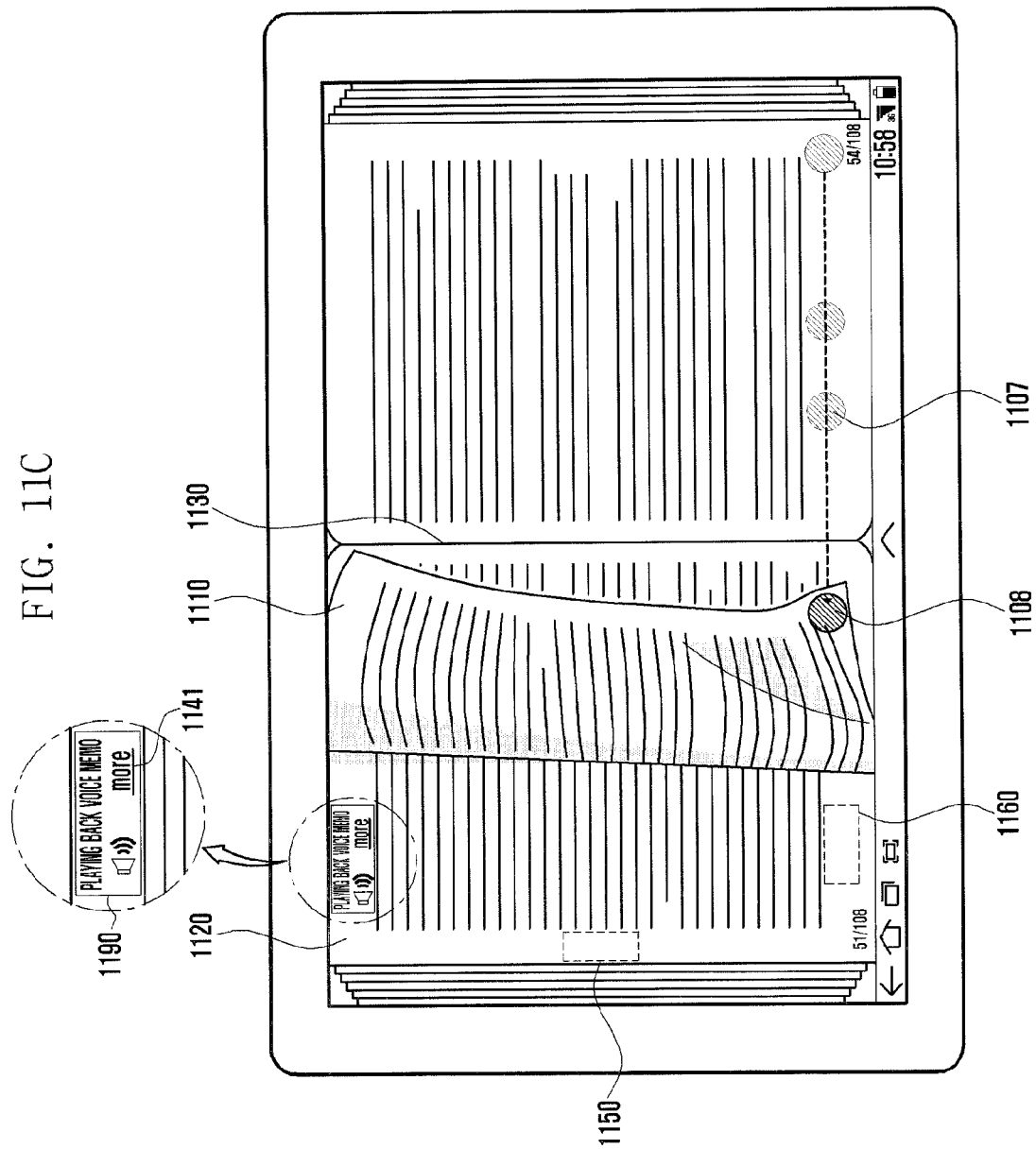

SYSTEM AND METHOD FOR PROVIDING FEEDBACK ASSOCIATED WITH E-BOOK IN MOBILE DEVICE

PRIORITY

This application claims the benefit under 35 U.S.C. § 119(a) of a Korean patent application filed on Apr. 10, 2012 in the Korean Intellectual Property Office and assigned Serial No. 10-2012-0037543, the entire disclosure of which is hereby incorporated by reference.

BACKGROUND OF THE INVENTION

1. Field of the Invention

The present invention relates to mobile devices having an e-book reader function. More particularly, the present invention relates to a system and method that provides various types of feedback associated with an e-book in a mobile device with an e-book reader function.

2. Description of the Related Art

An electronic book (e-book) is a book-length publication in digital form, including text, images, etc. that can be used as a printed book. Users may easily purchase and read e-books via electronic devices with an e-book reader function, such as smart phones, tablet PCs, etc., anywhere and anytime they want. This has led to an increase in the number of e-book users.

Mobile devices with an e-book reader function turn the pages of an e-book according to a user's input information. A system and method for turning pages of an e-book according to the related art does not provide users with sensitive feedback, e.g., a feeling as turning the pages of a printed book. If the system and method for turning the pages of an e-book according to the related art detects a user's input information regarding an action for turning pages of an e-book, e.g., an action for pressing a button for the next page, the system provides sight feedback that instantly replaces a current page with the next page. This sight feedback is not a process for turning pages; rather it is closer to a web browsing operation.

Recently, most mobile devices are equipped with touch screens. These mobile devices can detect users' gestures during the display of pages of an e-book, and provide an animation of pages turning in response to a user's detected gesture. Although mobile devices with touch screens according to the related art may provide users with the same feeling as turning the pages of a printed book, these mobile devices still do not provide a page with an animation that operates as if a page of a printed book is turned over.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a system and method that can provide sensitive feedback in response to a user's input information, associated with an e-book in a mobile device with an e-book reader function.

Another aspect of the present invention is to provide a mobile device adapted to the method for providing sensitive feedback.

In accordance with an exemplary embodiment of the present invention, a method for providing feedback associated with pages of an e-book in a mobile device with a touch screen is provided. The method includes displaying pages of the e-book on the touch screen, detecting a touch on one of the pages, detecting a movement of the touch, beginning a page turning operation in response to the movement of the touch, and providing audio feedback based on a history corresponding to the page, according to the page turning operation.

In accordance with another exemplary embodiment of the present invention, a method for providing feedback associated with pages of an e-book in a mobile device with a touch screen is provided. The method includes displaying pages of the e-book on the touch screen, playing back music in the mobile device, receiving a request for storing audio playback information corresponding to music that is being played back while a page is displayed, storing the audio playback information associated with the page, in response to the storage request, and playing back the music using the stored audio playback information, if a request is made to re-display the page or turn the re-displayed page.

In accordance with another exemplary embodiment of the present invention, a method for providing feedback associated with pages of an e-book in a mobile device with a touch screen is provided. The method includes displaying pages of the e-book on the touch screen, receiving a user's input information associated with the page, storing the user's input information associated with the page, and providing audio feedback using the user's input information, if a request is made to re-display the page or turn the re-displayed.

In accordance with another exemplary embodiment of the present invention, a mobile device is provided. The mobile device includes a touch screen for displaying pages of an e-book, a storage unit for storing a history corresponding to the pages, and a controller for controlling the touch screen. The controller detects a movement of a touch on a displayed page, begins a page turning operation in response to the movement of the touch, and provides audio feedback based on a history corresponding to the page in response to the page turning operation.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 11A to 11E, 12, and 13A to 13C illustrate screens describing a first embodiment of a feedback providing method according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
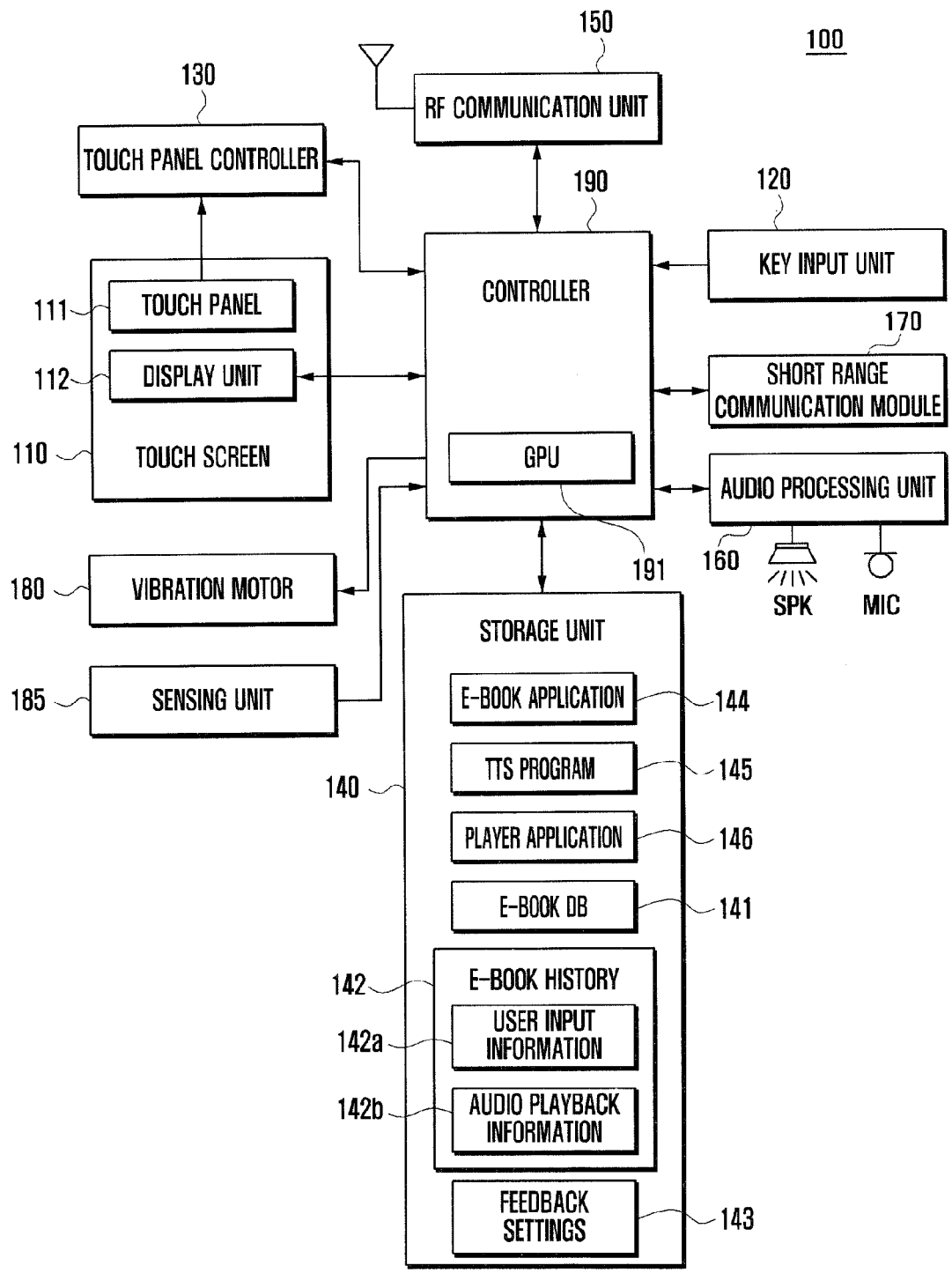
FIG. 1 illustrates a schematic block diagram showing a configuration of a mobile device according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

E-books may include books, textbooks, magazines, newspapers, comics, specialty publications, and the like. Each of these field may be further sub-divided. For example, book may be classified into novel, essay, poem, etc. An e-book contains text, images, audio, video, user's input information, etc.

The term 'animation' refers to a function of a mobile device for making the content, or a page, move. An animation shows the motion of an e-book that operates as if the page is protrudently deformed, is turned with being protrudently deformed, is pressed, is folded, or the like, in response to a user's input information (e.g., touch gesture, etc.).

The term 'page mesh' is defined as geometrical information regarding a page of an e-book. A page mesh includes a number of nodes and links connecting the nodes to each other. The nodes are allocated with respective masses. The links are also allocated with respective coefficients of elasticity. Coefficients of elasticity may be set to transfer actual feelings according to the characteristics of paper to users. For example, if a sheet of an e-book is set as thick (i.e., it has a large mass), the sheet may be allocated with a large coefficient of elasticity. If a sheet of an e-book is set as thin, the sheet may be allocated with a small coefficient of elasticity. Likewise, the nodes located at the inner parts of the pages (e.g., the gutter or spine) may be allocated with relatively large masses. The nodes located at the outer parts of the pages (e.g., the edges) have a larger change in position than at the inner parts, and are thus allocated with relatively small masses. It should be understood that all nodes may be allocated with the same mass.

Each node may be subjected to two types of forces. One is an inner force such as elastic force. The other is an external force such as gravity or human power. Gravity attracts nodes to the ground. The screen displaying a page of an e-book may be defined, in terms of direction, in such a way that the X-Y plane is parallel to the screen surface; the positive Z-axis is perpendicular to the X-Y plane, or located at the user's viewpoint; and the negative Z-axis is thus opposite to the positive Z-axis. The Z-axis is a virtual axis perpendicular to the X-Y plane, not an actual axis. Gravity is applied to all nodes. However, gravity may be applied to corresponding nodes of pages with different values according to the characteristics of paper, thereby transferring the same feeling as the actual paper to users. For example, when a user turns over a sheet of an actual paper book, the sheet may slowly fall if it is thin/light but fast if it is thick/heavy. The following Table 1 shows surface densities according to types of paper.

TABLE 1

| Paper type | Weight |
|---|---|
| Leaflet inserted between the pages of newspaper | 52.3 g/m$^2$ |
| Magazine body paper, advertising bill | 64 g/m$^2$ |
| Ticket, weekly cover, pamphlet | 127.9 g/m$^2$ |
| Fashion magazine cover, business card | 157 g/m$^2$ |
| Sketchbook | 200 g/m$^2$ |
| Printed paper | 75 g/m$^2$ |

As described in Table 1, for example, a pamphlet falls faster than a leaflet.

Human power refers to a user's force applied to a sheet of an e-book when the user turns the sheet over, e.g., a touch gesture applied to a touch screen. An example of the touch gesture is a flick action, a drag action, a press action, or the like. The touch gesture is a vector that is a quantity specified by a magnitude and a direction. When a user applies force to a node, the node moves in the direction of the force. In that case, the other nodes are also subjected to the user applying force to the node since they are connected to each other via links.

Accordingly, the nodes are subjected to the net forces acquired by computing the vector sum of the inner forces and the external forces, respectively. If a user applies force to a page displayed on the screen of the mobile device, the controller computes forces acting on the respective nodes based on the user's applied force, and deforms the page mesh based on the computed forces acting on the respective nodes. The user's applied force may be computed in such a way that an acceleration is first acquired via the distance running on the nodes and the velocity and then is multiplied by the mass of a corresponding node. Since the computations of force, acceleration, and velocity are well known, the detailed description is omitted in the following description. The mobile device reflects the deformed page mesh to the page and creates the animation. The creation of an animation based on the user's applied force may be executed via an Application Processor (AP), a Central Processing Unit (CPU), a Graphics Processing Unit (GPU), or the like.

The system and method for providing feedback according to exemplary embodiments of the present invention may be applied to various types of electronic devices with an e-book reader function and touch screens. The system and method for providing feedback according to exemplary embodiments of the present invention may be applied to mobile devices. Examples of the mobile device are mobile phones, smart phones, tablet PCs, hand-held PCs, Portable Multimedia Players (PMPs), e-book readers, Personal Digital Assistants (PDAs), and the like. In the following description, it is assumed that the system and method for providing feedback is applied to mobile devices with touch screens.

Exemplary embodiments of the system and method for providing sensitive feedback according to the invention are described below with reference to the accompanying drawings. Detailed descriptions of well-known functions and structures incorporated herein may be omitted to avoid obscuring the subject matter of the present invention.

FIG. 1 illustrates a schematic block diagram showing a configuration of a mobile device according to an exemplary embodiment of the present invention.

Referring to FIG. 1, the mobile device 100 includes a touch screen 110, a key input unit 120, a touch panel controller 130, a storage unit 140, an RF communication unit 150, an audio processing unit 160, a speaker (SPK), a microphone (MIC), a short-range communication module 170, a vibration motor 180, a sensing unit 185 and a controller 190. The touch screen 110 includes a touch panel 111 and a display unit 112.

The touch panel 111 may be placed on the display unit 112. The touch panel 111 creates signals according to the user's touch events and transfers them to the controller 190. The touch panel 111 may be implemented with an add-on type of touch panel placed on the display unit, an on-cell type or in-cell type of touch panel inserted in the display unit, or the like. The controller 190 identifies touch gestures according to the signals transferred from the touch screen 110, and controls the components in the mobile device.

The user's actions with respect to the touch screen 110 are classified into touches and touch gestures. Examples of the touch gestures are tap, double tap, long tap, drag, drag and drop, flick, press, and the like. 'Touch' refers to a gesture that contacts one point on the touch screen by using objects (e.g., fingers, stylus pen, etc.). 'Tap' refers to a gesture that strikes gently on one point on the touch screen via objects (e.g., fingers, stylus pen, etc.), i.e., a touch and touch-off gesture or a drop gesture. 'Double tap' refers to a gesture that strikes gently, successively, twice, one point on the touch screen by using objects (e.g., fingers, stylus pen, etc.). 'Long tap' refers to a gesture that contacts one point on the touch screen for longer than the 'tap' gesture and then releases it. 'Drag' refers to a gesture that touches one point on the touch screen and then moves to another location without removing the touch. 'Drag and drop' refers to a gesture that a drag gesture is performed and then releases the touch (touch off) from the touch screen. 'Flick' refers to a gesture that brushes lightly or moves faster than the 'drag' gesture on the touch panel by using objects (e.g., fingers, stylus pen, etc.) and then releases the touch therefrom. 'Press' refers to a gesture that contacts and presses one point on the touch screen by using objects (e.g., fingers, stylus pen, etc.). 'touch' refers to a state where an object (finger or stylus pen, etc.) is contacting the touch screen, and 'touch gesture' refers to a successive motion on the touch screen from a touch-on gesture until a touch-off gesture.

The touch panel 111 includes pressure sensors. The touch panel 111 detects pressure on a touched point and transfers a signal corresponding to the detected pressure to the controller 190. The controller 190 distinguishes between a touch and a press via the detected pressure. The touch panel 111 may be implemented with various types of panels, such as a resistive type, a capacitive type, an electromagnetic induction type, etc.

The display unit 112 converts video data from the controller 190 into analog data and displays it, under the control of the controller 190. The display unit 112 displays a variety of screens according to the operations of the mobile device, e.g., a lock screen, a home screen, an application execution screen, menu screens, a keypad screen, a message writing screen, an Internet screen, etc. A lock screen refers to a screen with a lock pattern, for example, displayed when the display unit 112 is turned on. In that case, when a touch event for unlocking the lock occurs on the lock screen, the controller 190 controls the display unit 112 to display a home screen or an application execution screen. A home screen refers to a screen showing a number of icons corresponding to application programs. When the user selects an icon corresponding to an application program, e.g., an e-book application, the controller 190 executes the application program and controls the display unit 112 to display the application execution screen.

The display unit 112 displays an animation under the control of the controller 190, e.g., an animation that operates as if a page is turned or a page is folded. The animations of pages turning may be displayed differently depending on the thickness of a sheet, a location where a touch is made on the page, the movement distance of a touch gesture, the movement direction of a touch gesture, the speed of a touch gesture, and the like. In addition, the animations of pages being folded may be displayed differently depending on the movement of a touch gesture, the movement direction of a touch gesture, the speed of a touch gesture, etc. from the corner area of a page. The corner area of a page refers to an area within a radius from the corner of a page, e.g., 1 cm.

The display unit 112 may be implemented with a flat display panel, such as a Liquid Crystal Display (LCD), Organic Light Emitting Diodes (OLEDs), Active Matrix Organic Light Emitting Diodes (AMOLEDs), or the like.

The key input unit 120 includes a number of input keys and function keys that receive numbers and letters and set a variety of functions in the mobile device. The function keys include direction keys, side keys, shortcut keys, etc., which are set to perform specific functions. The key input unit 120 creates key signals, related to a user's settings and function controls of the mobile device 100, and transfers the key signals to the controller 190. Examples of the key signals include a signal for turning on/off the mobile device 100, a signal for adjusting the volume, a signal for turning on/off the screen, etc. The controller 190 controls corresponding components according to the key signals. The key input unit 120 may be implemented with a QWERTY keypad, a 3×4 keypad, a 4×3 keypad, and the like, which includes a number of keys. If the mobile device 100 is designed to include a full touch screen, the key input unit 120 may be implemented with one or more side keys for turning on/off the screen or the mobile device 100, which are installed to the side of the case of the mobile device 100.

The touch panel controller 130 receives signals corresponding to touch events from the touch panel 111, performs Analog to Digital (AD) conversion to convert the received signals to digital signals, and transfers the digital signals to the controller 190. The controller 190 detects touch gestures via the signals from the touch panel controller 130. The controller 190 detects a location where a touch is made on the page, the movement distance of a touch gesture, the movement direction of a touch gesture, the speed of a touch gesture, the pressure of a touch, and the like.

The storage unit 140 stores an Operating System (OS) of the mobile device 100 and application programs according to the invention. The storage unit 140 also stores data. The storage unit 140 includes a program storage area and a data storage area.

The data storage area stores data that is created when the mobile device 100 is used or data that is downloaded from the external system, e.g., e-books, contacts, images, document files, videos, messages, emails, music files, audio data corresponding to sound effects, and the like. The data storage area also stores screen data to be displayed via the display unit 112. For example, a menu screen may include a key for altering screens (e.g., a return key for returning to the previous screen, etc.), a key for controlling a currently executed application, and the like. The data storage area temporarily stores data via a copying and pasting command, e.g., data copied from messages, photographs, web pages, documents, and the like. The data storage area also store values for setting the functions of the mobile device, e.g., the level of screen brightness, a determination as to whether to operate a vibration when a touch is made, a determination as to whether the screen is automatically rotated, etc.

The data storage area stores an e-book DB 141 including a number of e-books, e-book histories 142 regarding the respective e-books, feedback settings 143, and the like. The e-book histories 142 include dates when e-books are stored, the read number of an e-book, the page read, the date read, the page to be read, the user's input information 142*a*, audio playback information 142*b*, and the like. The user's input information 142*a* refers to information regarding a page or a displayed page that the user input. Examples of the user's input information are memos, voice memos, handwritten notes, highlights (e.g., underline, shade, etc.), images, bookmarks, and the like. The user's input information 142*a* or a tag representing the information 142*a* (e.g., a symbol including an icon representing a voice memo) may be displayed while the page corresponding to the information 1142*a* is displayed. The audio playback information 142*b* refers on information related to audio played back while the e-book is executed (e.g., a song title, a singer, a running time, a page number displayed during the playback, etc.).

The program storage area stores an Operating System (OS) for booting the mobile device and controlling the entire operation of the components therein, and a number of application programs. The program storage area may also store a web browser for accessing the Internet; a camera application for capturing, displaying, and storing photographs and videos; an e-book application 144 for displaying e-books stored in the e-book DB 141; a Text to Speech (TTS) program 145 for converting text to voice data; a player application 146 for playing back and editing audio files, etc. The TTS program 145 may be implemented with a component of the e-book application 144 for converting highlights, memos, handwritten notes, etc. to voice data. The TTS program 145 includes a voice database (DB) for performing TTS conversion. For example, the TTS program 145 loads voice data corresponding to words from a text, e.g., a word 'page', from the voice DB, and synthesizes the loaded voice data 'page' and the text data 'page', thereby creating the voice data 'page'. Since the TTS conversion technology is well-known in the art, its detailed description will be omitted.

The RF communication unit 150 performs a voice/video call, data communication, etc., under the control of the controller 190. To this end, the RF communication unit 150 includes an RF transmitter for up-converting the frequency of signals to be transmitted and amplifying the signals and an RF receiver for low-noise amplifying received RF signals and down-converting the frequency of the received RF signals. The RF communication unit 150 includes a mobile communication module (e.g., a 3rd-Generation (3G) mobile communication module, 3.5G, 4G, etc.), a digital broadcasting module (e.g., a DMB module), etc.

The audio processing unit 160 converts voice data, audio data of audio files into analog signals and outputs the analog signals via a speaker, according to the control of the controller 190. The audio processing unit 160 also converts audio signals such as voices, received via a microphone, into digital signals and then transfers them to the controller 190.

The audio processing unit 160 provides audio feedback related to an e-book under the control of the controller 190. For example, the audio processing unit 160 outputs a sound effect to the speaker when a page is deformed (e.g., a page is turned over, a page is pressed, a page is folded, etc.). The page-deforming sound effects may differ from each other, according to the thickness of a sheet, a location where a touch is made on the page, the movement distance of a touch gesture, the movement direction of a touch gesture, the speed of a touch gesture, and the like. In addition, when a page is turned over, the audio processing unit 160 also provides audio feedback related to the page. For example, the audio processing unit 160 converts a title of a chapter of an e-book, indexes, memos, highlights, and the like into voice data and then outputs the voice data. In addition, if a user opens a page of an e-book that was stored as a page that the user has most recently read (e.g., the user terminated the e-book application while reading Page 78 of an e-book and thus Page 78 was stored as the most recently read page), the audio processing unit 160 outputs a corresponding alarm sound to the speaker. In that case, if a user hears an alarm sound while rapidly turning pages, the user can recognize the current page is the most recently read page.

The short-range communication module 170 allows the mobile device 100 to communicate with external systems in wired or wireless mode. The short-range communication module 170 may be implemented with a module according to Zigbee, Wi-Fi, Bluetooth, Near Field Communication (NFC) or the like. In particular, the short-range communication module 170 receives e-books from external systems and transfers the e-books to the storage unit 140 under the control of the controller 190.

The vibration motor 180 operates under the control of the controller 190. The vibration motor 180 provides touch feedback. Touch feedback may be achieved via one or more vibration motors under the control of the controller 190. The types of feedback by the vibration motor 180 may differ according to the material of a sheet, the thickness of a sheet, etc. For example, the controller 190 may detect a movement of a touch that is made on a page displaying on the touch screen 110. In that case, the controller 190 controls the vibration motor 180 to create vibrations in response to the detected touch movement. If the page was set as a stiff type of paper like magazines, the vibration motor 180 may create a level of vibration for the stiff type of paper stronger than that for the thin type of paper.

The sensing unit 185 detects signals related to changes in tilt, illumination, and acceleration of the mobile device 100, and transfers the signals to the controller 190. The sensing unit 185 detects changes in the state of the mobile device 100, creates the signals, and transfers the signals to the controller 190. The sensing unit 185 may include various types of sensors. The controller 190 may supply one or more of such sensors with electric power when the mobile device 100 is turned on (or according to the user's settings), and detects the change in states of the mobile device 100 via the operated sensors. According to an exemplary embodiment of the present invention, the sensing unit 185 is always enabled to detect the changes in states, or tilt, of the mobile device 100. Alternatively, the sensing unit 185 may be enabled according to a user's setting.

The sensing unit 185 may be implemented with one or more sensing devices to detect the change in states of the mobile device 100. Examples of the sensing devices include an acceleration sensor, a gyro sensor, a luminance sensor, a proximity sensor, a pressure sensor, a noise sensor (e.g., a microphone), a video sensor (e.g., a camera module), a timer, and the like. The sensing unit 185 may be implemented with one chip where a number of sensors are integrated. Alternatively, the sensing unit 185 may be implemented with a number of sensors that are formed as respective chips. For example, the controller 190 may detect the current state of the mobile device 100, via information regarding the tilt detected by a motion sensor (e.g., values detected with respect to X-, Y-, and Z-axes).

The sensing unit 185 measures the acceleration of the mobile device 100, creates the electrical signal, and transfers the signal to the controller 190. For example, if the sensing unit 185 is a three-axis acceleration sensor, the sensing unit 185 may measure the acceleration of gravity with respect to X-, Y- and Z-axes. The sensing unit 185 may measure a net acceleration from the vector sum of the acceleration of motion of the mobile device 100 and the acceleration of gravity. If the mobile device 100 does not move, the sensing unit 185 can measure only the acceleration of gravity.

According to an exemplary embodiment of the present invention, it is assumed that the direction of the acceleration of gravity is positive if the front side of the mobile device 100 faces upward and negative if the back side faces upward. If the mobile device 100 is placed on a horizontal surface of an object so that the back side faces the surface, the sensing unit 185 measures the acceleration of gravity as 0 m/sec2 with respect to X- and Y-axis components and a positive value (e.g., 9.8 m/sec2) with respect to Z-axis component. If the mobile device 100 is placed on a horizontal surface of an object so that the front side faces the surface, the sensing unit 185 measures the acceleration of gravity as 0 m/sec2 with respect to X- and Y-axis components and a negative value (e.g., −9.8 m/sec2) with respect to Z-axis component.

If the mobile device 100 is tilted because the user holds the mobile device 100 with one hand, the sensing unit 185 may measure the acceleration of gravity where one or more axes components are not 0 m/sec2. In that case, the square root of the sum of the squares of three axes components, i.e., the magnitude of the vector sum of the three axes components, may be a certain value (e.g., 9.8 m/sec2). The sensing unit 185 also detects accelerations with respect to X-, Y-, and Z-axis directions. It should be understood that the axes and the accelerations of gravity corresponding to the axes may differ from each other, respectively, according to the locations where the sensing unit 185 is attached.

The controller 190 controls the entire operation of the mobile device 100 and the signals flowing among the components therein. The controller 190 processes data. The controller 190 also controls the electric power supplied to the components from the battery. The controller 190 executes the application programs stored in the program storage area. The controller 190 deforms a page in response to a touch gesture (e.g., a drag, a flick, etc.). The controller deforms a page in response to a touch gesture or information regarding how much the mobile device is tilted.

To this end, the controller 190 includes a Graphics Processing Unit (GPU) 191. The GPU 191 deforms a page mesh in response to a touch gesture and creates an animation of the page based on the deformed page mesh. The GPU 191 receives information regarding a touch gesture from the touch panel controller 130 and deforms a page mesh based on the received information. If the user applies force to a page, the GPU 191 deforms a page mesh according to the applied force. If the user's applied force is removed (e.g., if the user removes his/her touch after performing a drag or press action), the GPU 191 restores the deformed page mesh to the original one. The deformed page mesh is restored to the original state by the elastic forces of the links and the forces of gravity applied to the respective nodes. The GPU 191 receives pages from the storage unit 140. The GPU 191 reflects information regarding deformation of a page mesh to a page transmitted from the storage unit 140, and creates the animation of the page. The information regarding deformation of a page mesh includes coordinates (x, y, z) of respective nodes forming the page mesh. The GPU 191 controls the display unit 112 to display animations.

If the controller 190 measures the accelerations of gravity transferred from the sensing unit 185 via one or more axis components, the controller 190 may calculate a tilt of the mobile device 100 via the accelerations with respect to the respective axes. The acquired tilt may include a roll angle $\Phi$, a pitch angle $\theta$, and a yaw angle $\psi$. The roll angle $\Phi$, pitch angle $\theta$, and yaw angle $\psi$ are rotational angles with respect to X-, Y- and Z-axes, respectively. For example, if the X- and Y-axis components of the acceleration of gravity transferred from the sensing unit 185 are 0 m/sec2 and the Z-axis component is 9.8 m/sec2, the tilt ($\Phi$, $\theta$, $\psi$) of the mobile device 100 is (0, 0, 0). As such, the method according to exemplary embodiment the invention can calculate any tilt of the mobile device 100. The controller 190 may calculate the tilt of mobile device 100 via a variety of algorithms, e.g., a position computational algorithm using the Euler angles or an extended Kalman filter, an acceleration estimation switching algorithm, and the like. The measurement of the tilt of the mobile device 100 via an accelerometer may be implemented with a variety of methods.

The controller 190 deforms a page mesh in response to the change in tilt of the mobile device 100 and alters the page according to the page mesh, thereby creating the animation of a page. The controller 190 detects a tilt of the mobile device 100, calculates the deformation degree of a page based on the detected tilt, and creates and displays an animation corresponding to the calculation. For example, if the mobile device 100 is tilted at a tilt (0, 0, 60); operates in a landscape mode as a display mode where two pages are displayed on the screen side by side; and has 200 pages to be turned over as the number of remaining pages displayed on the right part of the screen, the controller 190 may create and display an animation of turning over 100 pages to the left part of the screen.

A page turning mode includes a normal mode, a gradient mode, and a merge mode. A page turning mode may be set according to a user's request. If the user sets the page turning mode to a normal mode, the GPU 191 creates an animation in response to the detected touch gesture. If the user sets the page turning mode to a gradient mode, the GPU 191 creates an animation by using a calculated tilt. Likewise, if the user sets the page turning mode to a merge mode, the GPU 191 creates an animation by using a touch gesture and a calculated tilt. The properties (e.g., thickness, weight, material, etc.) set for pages may be taken into account in deforming a page with respect to the respective modes described above. Alternatively, the properties set for pages need not be taken into account in deforming a page. Animations may be created by both or either of the GPU 191 and an Application Processor. The AP may be a System on Chip (SoC) that integrates a CPU and a GPU into a single chip. Alternatively, the AP may be formed in such a way that a CPU and a GPU are packaged in multi-layers.

With the convergence of digital devices, there may be many digital devices and modifications thereof, not listed in herein, and it will be appreciated that they can also be included in the mobile device. For example, the mobile device may further include a GPS module, a camera module, etc. Also, it will be appreciated that, according to the purposes, the mobile device may be implemented by omitting a particular element from the configuration shown in FIG. 1 or replacing the particular element with other elements.

Figure 2A:
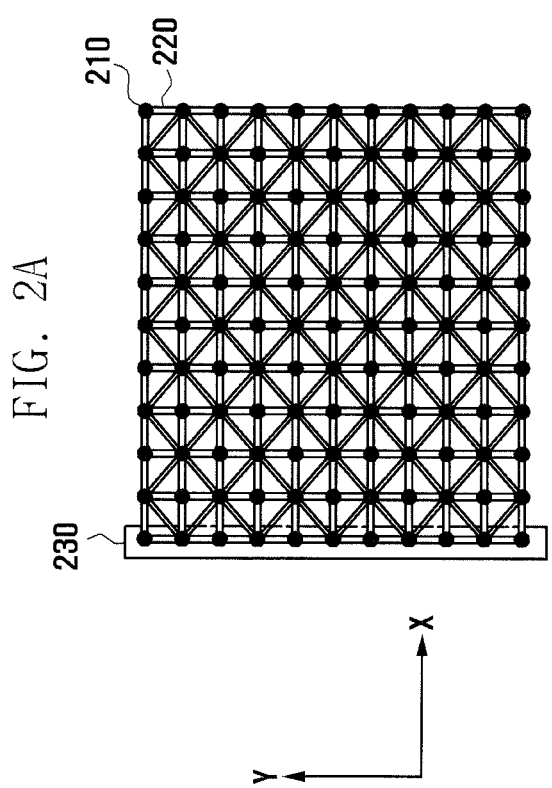
FIGS. 2A to 2B illustrate page meshes according to an exemplary embodiment of the present invention.
Figure 2B:
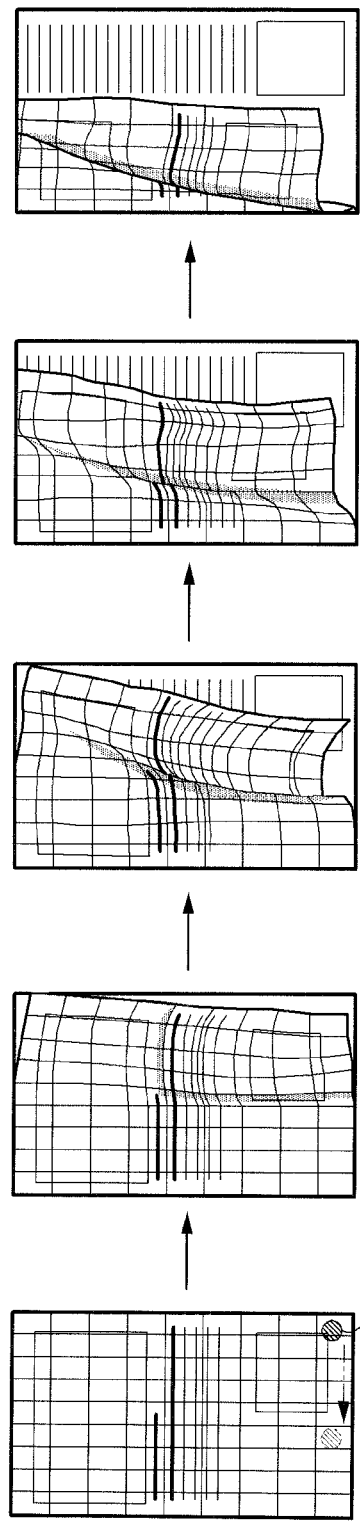

FIGS. 2A to 2B illustrate page meshes according to an exemplary embodiment of the present invention.

Referring to FIG. 2A, the controller 190, or the GPU 191, forms a page mesh. A page mesh includes a number of nodes 210 and a number of links 220 connecting the nodes. For the sake of convenient description, reference numbers 210 and 220 represent a node and a link respectively. The nodes are arrayed in a matrix form, and the respective positions may be represented via x and y coordinates. As described above, the nodes are allocated with masses respectively, and the links (serving as springs) are also allocated with the coefficients of elasticity respectively. The nodes arrayed close to and along the gutter 230 of an e-book are allocated with a larger mass by rows than those arrayed close to and along the side edge. Accordingly, the closer to the side edge the lighter the movement of the nodes. The closer to the side edge the more sensitive the nodes are according to a touch gesture. The nodes located at the gutter 230 are fixed (do not move) while the other nodes on a page are moved when the page is turned over. According to another exemplary embodiment, all nodes may be allocated with the same mass. In that case, the motion of a page mesh is heavier than that of the page mesh in the previous exemplary embodiment. Accordingly, the deformation degrees of the pages differ from each other according to the properties (e.g., thickness, weight, materials, etc.) set to corresponding pages. In addition, the deformation degrees of the pages differ from each other according to the calculated tilts.

If a user applies force, i.e., a touch gesture, to a page, the controller 190, i.e., the GPU 191, detects the touch gesture, deforms a page mesh in response to the detected touch gesture, and creates an animation of the page by reflecting the deformed page mesh to the page. As shown in FIG. 2B, if the user touches a spot 240 at the bottom right of a page via an object (e.g., the finger, a stylus pen, etc.), the controller 190 detects the node touched by the object. If the user moves the object from the spot 240 at the bottom right to the left, the controller 190 moves the touched node (hereinafter called 'target node') on the X-Y plane in the left direction according to the movement of the object. In that case, the target node is moved in the direction perpendicular to the direction of the force of gravity. Since the nodes located at the gutter 230 are fixed while the other nodes on a page are moved according to an external force applied thereto, the mesh of the page is protrudently deformed as if an actual page of a printed book is turned over as an external force is applied to the page.

The controller 190 calculates the displacement of the target node that is moving. The displacement is a vector. The magnitude of the displacement includes at least one of the current location of the target node, the distance that target node moved, and the speed of the target node, or the combination thereof. The controller 190 deforms a page mesh according to the calculated displacement. For example, as shown in FIG. 2B, while the spot 240 at the bottom right is being moved from the right to the left, the page mesh close to the spot 240 is deformed protrudently in the positive Z-axis. The controller 190 creates an animation of the page by reflecting the deformed page mesh to the page.

The controller 190 may calculate the magnitudes of the forces applied to the respective nodes by using the calculated displacements. The forces are vectors. The force refers to a net force acquired by computing the vector sum of an elastic force, the force of gravity and a user's applied force. If the page turning mode is set as a gradient mode or a merge mode, the force may further include the tilt components. The controller 190 calculates locations of respective nodes by using the calculated forces. The controller 190 creates an animation of pages turning by using the calculated locations, as shown in FIG. 2B.

As described above referring to FIGS. 2A and 2B, page meshes are deformed as if paper pages are turned over according to a touch spot, the movement direction of a touch, and the speed of a touch, etc. Therefore, the users who turn over pages of an e-book via the mobile device can experience the same feeling as turning over pages of a paper book.

Figure 3:
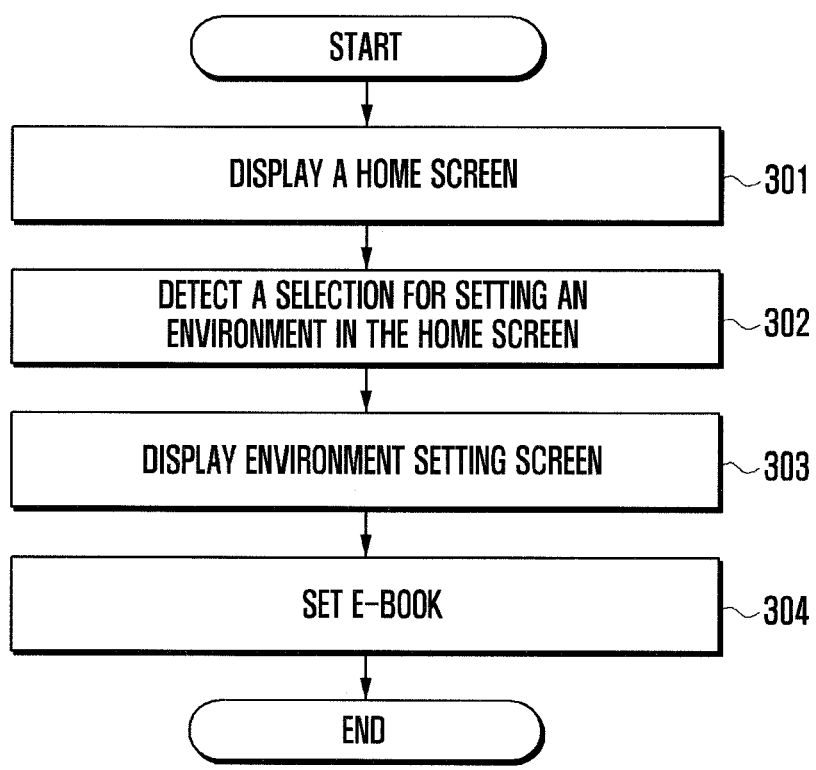
FIG. 3 illustrates a flow chart describing a method for setting an e-book according to an exemplary embodiment of the present invention.

FIG. 3 illustrates a flow chart describing a method for setting an e-book according to an exemplary embodiment of the present invention.

Referring to FIG. 3, the controller 190 controls the display unit 112 to display a home screen in step 301. The home screen shows an icon corresponding to the settings for the mobile device 100. If the user selects (e.g., to tap) the icon corresponding to the settings, the controller 190 detects the user's selection in step 302. The controller 190 controls the display unit 112 to display a screen corresponding to the settings for the mobile device 100 in step 303. The controller 190 sets the preference of the e-book in step 304. The user may operate the touch panel 111 on the preference setting screen to set the preference for the mobile device 100, in particular, the environment for e-book. The information regarding the settings for e-book is stored in the storage unit 140. The stored e-book setting information (e.g., feedback settings 143) is used when the e-book application 142 is executed. The preference setting screen may include a variety of items according to the performance and functions of the mobile device 100. For example, the preference setting screen may include a number of items related to a wireless network, a location service, sound, display, security, e-books, and the like. If an e-book item is touched, the controller 190 controls the display unit 112 to display a screen for setting e-books, which is shown in FIG. 4.

Figure 4:
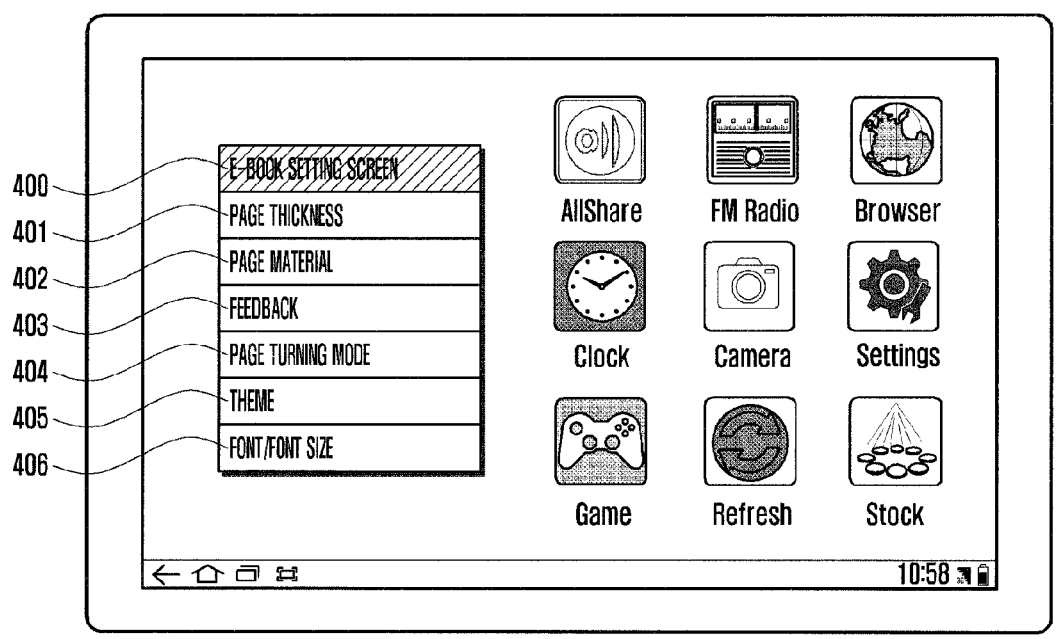
FIG. 4 illustrates a screen for setting an e-book, according to an exemplary embodiment of the present invention.

FIG. 4 illustrates a screen for setting an e-book, according to an exemplary embodiment of the present invention.

Referring to FIG. 4, the display unit 112 displays an e-book setting screen 400 under the control of the controller 190. The e-book setting screen 400 includes a number of items, page thickness 401, page material 402, feedback 403, page turning mode 404, theme 405 and font/font size 406. Page thickness 401 and page material 402 may be set as a printed paper, 75 g/m2. Page thickness 401 and page material 402 may be set by the e-book manufacturers, in which case the user may not alter the set values. Feedback 403 is an item to set a type of feedback to be provided to the user when pages are turned. For example, the user may set feedback 403 to enable one or more types of feedback, i.e., visual feedback, audio feedback, and touch feedback. Page turning mode 404 is an item to set one of a normal mode, a gradient mode and a merge mode. If the user sets the page turning mode 404 to a normal mode, the GPU 191 creates an animation in response to the detected touch gesture. If the user sets the page turning mode 404 to a gradient mode, the GPU 191 creates an animation by using a calculated tilt. If the user sets the page turning mode 404 to a merge mode, the GPU 191 creates an animation by using a touch gesture and a calculated tilt. Theme 405 is an item to set the background of pages. For example, the user may set the background of pages to white, via theme 405. Font/Font size 406 is an item to set the font and size of letters on pages. For example, the user may set letters on pages to 'Gothic' as font and '12 point' as font size, respectively, via Font/font size 406.

FIGS. 5A to 5D illustrate screens for setting types of feedback associated with an e-book according to an exemplary embodiment of the present invention.

Figure 5A:
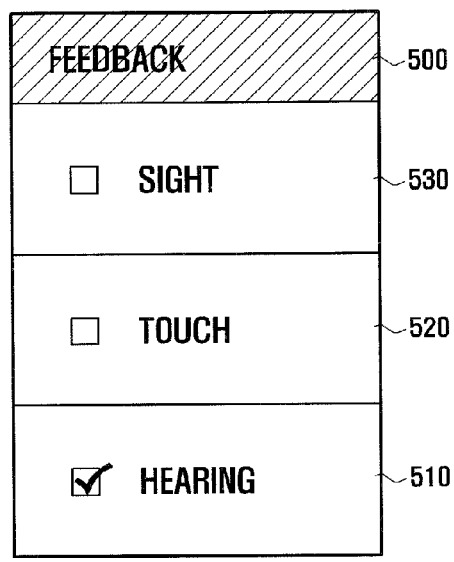
FIGS. 5A to 5D illustrate screens for setting types of feedback associated with an e-book according to an exemplary embodiment of the present invention.

Referring to FIG. 5A, the controller 190 controls the display unit 112 to display a feedback setting screen 500. The controller 190 detects a selection of an audio setting 510 (e.g., a tap on the box). In that case, the controller 190 displays a check mark on the box of the audio setting 510 in response to the tap thereon. The user may further select a touch setting 520 and/or a visual setting 530. Alternatively, none of the settings 510, 520 and 530 may be selected. In that case, the controller 190 doesn't provide any feedback.

When a page is deformed, the controller 190 provides one or more preset types of feedback (i.e., one or more types of feedback with a tick).

If sight feedback as a type of feedback is set, the controller 190 provides an animation of page as if it is protrudently deformed as shown in FIG. 2B. In that case, the items of information in the page, such as text, memos, highlights, etc., are also protrudently deformed.

In addition, if touch feedback as a type of feedback is set, the controller 190 operates the vibration motor 180 to provide touch feedback. For example, the controller 190 may control the vibration motor 180 to create vibrations in response to a movement of a touch. If the page was set to a stiff material, such as magazines, the controller 190 may control the vibration motor 180 to make a level of vibration stronger than the case where a material of a page is set to a type of papers that is relatively thinner than others.

Figure 5B:
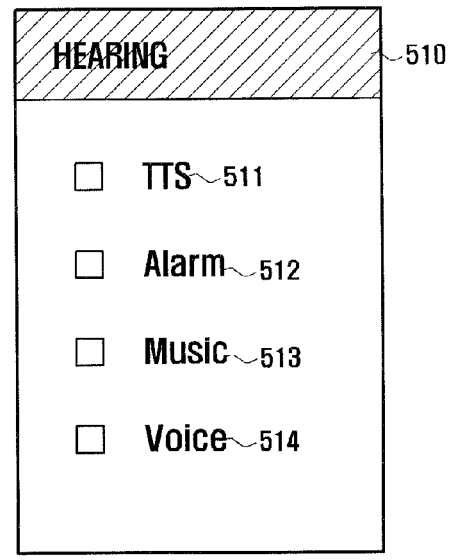

Likewise, if audio feedback as a type of feedback is set, the controller 190 controls the audio processing unit 160 to provide audio feedback. In particular, when a page is turned, the controller 190 can provide audio feedback associated with the page. Referring to FIG. 5B, the audio setting 510 may include a number of items, such as TTS 511, Alarm, 512, Music 513, and Voice 514.

If TTS 511 as a type of audio feedback is set, when a page is turned the controller 190 converts the information associated with the page (such as a title of the chapter, indexes, memos, highlights, etc.) into voice data, and outputs the voice data. The time when a page is turned may be a time when the controller 190 detects a touch gesture to turn a page. For example, if the controller 190 detects a drag or flick gesture and identifies that the detected gesture moves in a direction to turn a page (e.g., a direction from the left to the right), the controller 190 may determine the time point when detecting the touch gesture as a time point that the page is turned. When a page is not completely turned over, the controller 190 may provide audio feedback associated with the page.

Figure 5C:
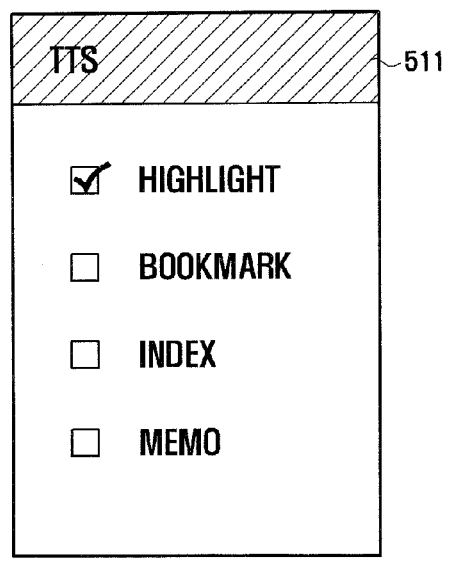

The type of audio feedback related to TTS 511 may be further set according to the detailed items. For example, as shown in FIG. 5C, text that can be converted to voice data may be at least one of the items, such as highlight (e.g., underlined portions in a page), bookmark (e.g., a page number of a corresponding page with a bookmark), index, memo, etc. As shown in FIG. 5C, if TTS 511 is set to be enabled via highlight item, then when a page is turned the controller 190 converts highlights in the page into voice data and outputs the voice data.

If the mobile device 100 operates in a landscape mode, the controller 190 controls the display unit 112 to display two pages side by side. Likewise, if the mobile device 100 operates in a portrait mode, the controller 190 controls the display unit 112 to display one page on the screen. During the display of a first page, the controller 190 may detect a touch gesture (e.g., a first drag gesture) for turning the first page on the displayed, first page. The controller 190 turns the first page by deforming the first page protrudently in response to the first drag gesture and then displays the next page, a second page on the display panel. If the second page was set to make an alarm by ticking the item of Alarm 512 and stored as the most recently read page (e.g., if the user ended an e-book application while reading Page 78, the page that the user has most recently read, i.e., the most recently read page, is Page 78), the controller 190 may output an alarm sound when the page is displayed. The controller 190 may detect a touch gesture (e.g., a second drag gesture) for turning the second page on the displayed, second page. The controller 190 turns the second page with deforming it protrudently in response to the second drag gesture.

If the controller 190 ascertains that the difference between time points that a current touch gesture (e.g., the second drag gesture described above) and the previous touch gesture (e.g., the first drag gesture described above) are detected is less than or equal to a preset period of time (e.g., 2 seconds), and the second page (the current page) is the most recently read page, then the controller 190 may not respond to the currently detected touch gesture, i.e., the second drag gesture. In that case, the second page may not be turned. This is to provide the user, who is likely to rapidly turn pages without checking the second page, with sight feedback such that the user would not turn the second page. In addition, if the controller 190 ascertains that the difference between time points that a current touch gesture (e.g., the second drag gesture described above) and the previous touch gesture (e.g., the first drag gesture described above) are detected is less than or equal to a preset period of time; and the second page includes user's input information (e.g., highlights, etc.), the controller 190 may not respond to the second drag gesture currently detected.

Figure 5D:
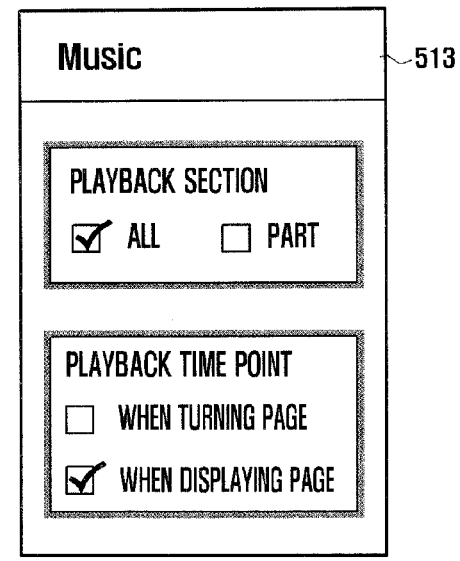

If Music 513 as a type of audio feedback is set, the controller 190 plays back music based on the audio playback information 142b. Referring to FIG. 5D, the controller 190 may set the music playback section to Part or All of pieces of music, based on the Music setting 513. Alternatively, the controller 190 may set a music playback time point to when a page is turned or displayed, based on the Music setting 513. For example, the playback section of a song, 'My way', between 1 and 2 minute on the playback timeline, is associated with Page 78. This indicates that the user may be hearing the song 'My way' playing back between 1 and 2 minute on the playback timeline while reading Page 78. In that case, the controller 190 may play back the entire section of the song 'My way' from the beginning position or a part of the section between 1 and 2 minute on the playback timeline, when Page 78 is turned or displayed. If a corresponding page is displayed while the page has not been completed turned, the controller 190 may start playing back music associated with the page.

Figure 6:
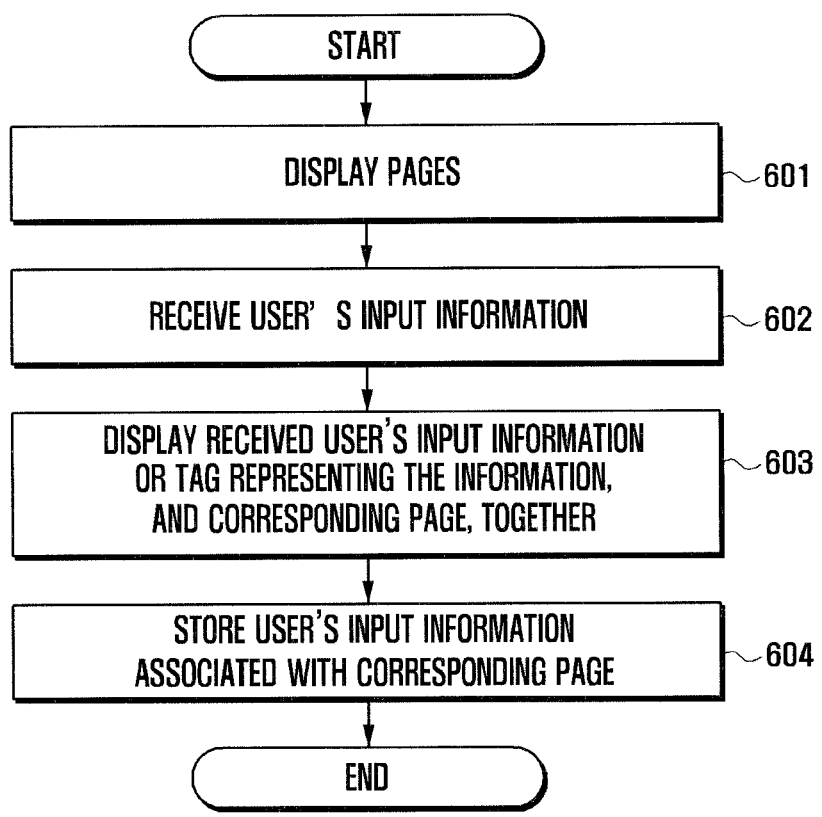
FIG. 6 is a flow chart describing a method for storing a user's input information associated with pages, according to an exemplary embodiment of the present invention.
Figure 7A:
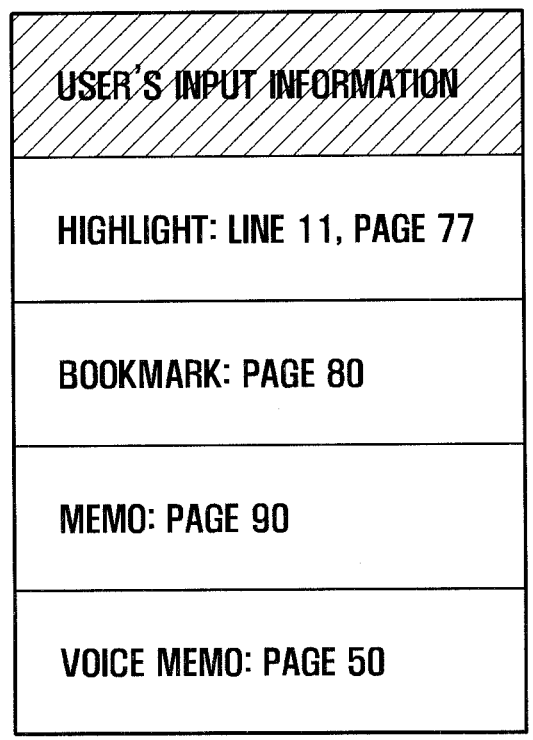
FIGS. 7A and 7B illustrate an example of stored user input information, according to an exemplary embodiment of the present invention.
Figure 7B:
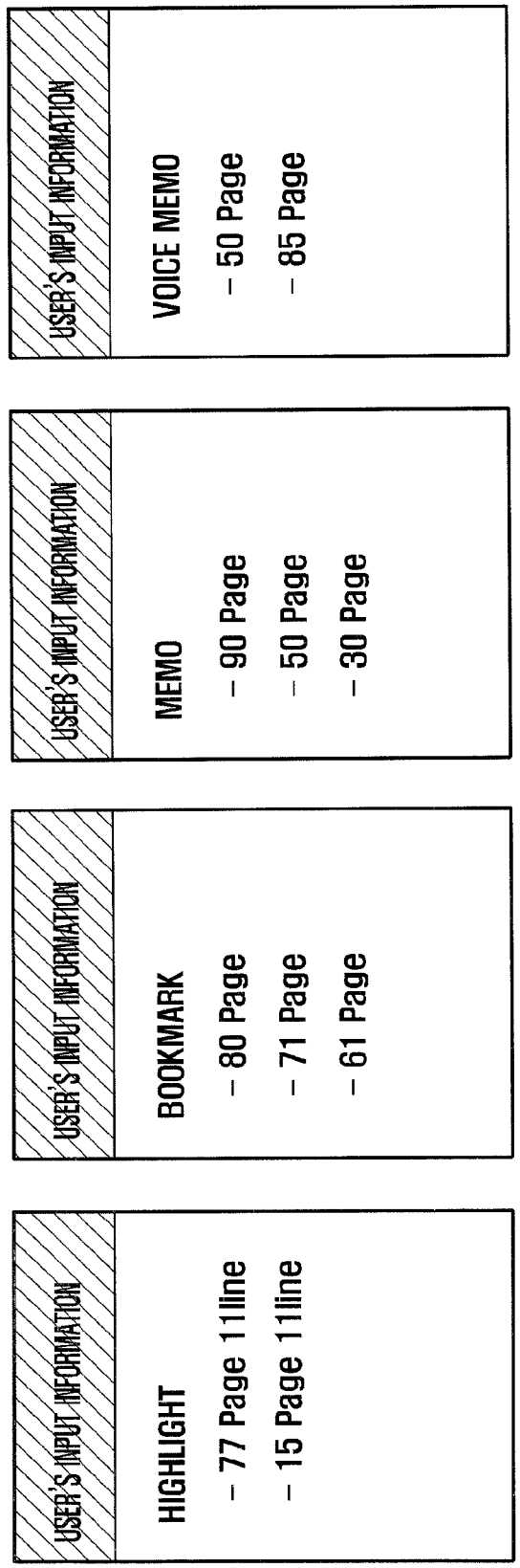

FIG. 6 is a flow chart describing a method for storing a user's input information associated with pages, according to an exemplary embodiment of the present invention. FIGS. 7A and 7B illustrate an example of user's input information stored, according to an exemplary embodiment of the present invention.

Referring to FIG. 6, it is assumed that the mobile device 100 operates in an idle state. In that case, the controller 190 controls the display unit 112 to display a home screen showing an icon for executing an e-book application. The controller 190 detects touch gestures related to the request for the execution of the e-book application. If a request is made to execute the e-book application, the controller 190 detects the request, executes the e-book application, and displays the cover sheet of the e-book or a page of the e-book that the user has most recently read.

The controller 190 loads pages of an e-book from a database and displays them on the touch screen 110 in step 601. If the e-book is an e-book that is first executed, the controller 190 may display the contents or the first page. If the executed e-book is an e-book that has been executed, the controller 190 displays a page that the user most recently read (i.e., the most recently read page). The controller 190 controls the display unit 112 to protrudently display pages of the e-book to resemble pages of a paper book open on a desk. Alternatively, the controller 190 may control the display unit 112 to evenly display pages of the e-book. The option as to whether pages are protrudently or evenly displayed may be set in the setting mode of the mobile device 100 according to a user's settings.

In addition, the controller 190 controls the display unit 112 to display the edge of an e-book, showing the volume (thickness). The controller 190 controls the display unit 112 to display the edge of an e-book, showing the volume (thickness) proportional to that of the remaining pages to be read with respect to page number that is currently displayed. For example, if an e-book has a total of 100 pages and is currently displaying Page 21, there are 80 pages. Accordingly, the controller 190 controls the display unit 112 to display the edge with a thickness corresponding to the remaining 80 pages. If there are 20 pages remaining, the controller 190 controls the display unit 112 to display the edge with a thickness corresponding to the remaining 20 pages. Alternatively, the controller 190 may control the display unit 112 to display the volume of an e-book, in proportion to the thickness of each page (sheet). For example, referring to Table 1, although a sketch book and a book of printed paper have the same number of pages, the sketch book is thicker in volume than the book of printed paper.

The controller 190 receives user's input information via the touch screen 110, the key input unit 120 or the microphone in step 602. The user may input information associated with a page displayed on the touch screen 110 to the mobile device 100. Inputting user's information may be achieved via a variety of methods based on a touch screen 110. For example, the controller 190 may display a keypad screen, superimposed on pages of an e-book, on the touch screen 110. The controller 190 may receive information that the user inputs on the touch screen 110 displaying the keypad. Alternatively, the controller 190 may also display a screen for executing a function for recording a voice memo, superimposed on pages of an e-book, on the touch screen 110. If the user selects (e.g., taps) a recording button on the record execution screen, the controller 190 operates the audio processing unit 160 and the microphone and receives voice data via them. The controller 190 controls the display unit 112 to display the received user's input information or a tag (e.g., an icon voice file a) representing the information, and the corresponding pages, together in step 603.

The controller 190 stores the received user input information, as histories 142, in the storage unit 140 in step 604. The user input information is associated with the corresponding pages and stored in the storage unit 140.

FIGS. 7A and 7B illustrate an example of stored user input information, according to an exemplary embodiment of the present invention.

Referring to FIG. 7A, the controller 190 may store the user input information, such as a highlight in line 11 on Page 77, a bookmark on Page 80, a memo on Page 90, and a voice memo on Page 50. Alternatively, the controller 190 may store the user input information, the highlights, bookmarks, memos, and voice memos, associated with corresponding pages of an e-book, in one page.

Alternatively, referring to FIG. 7B, the controller 190 may store the user input information, highlights, bookmarks, memos and voice memos, associated with corresponding pages of an e-book, in pages separately and respectively.

Figure 8:
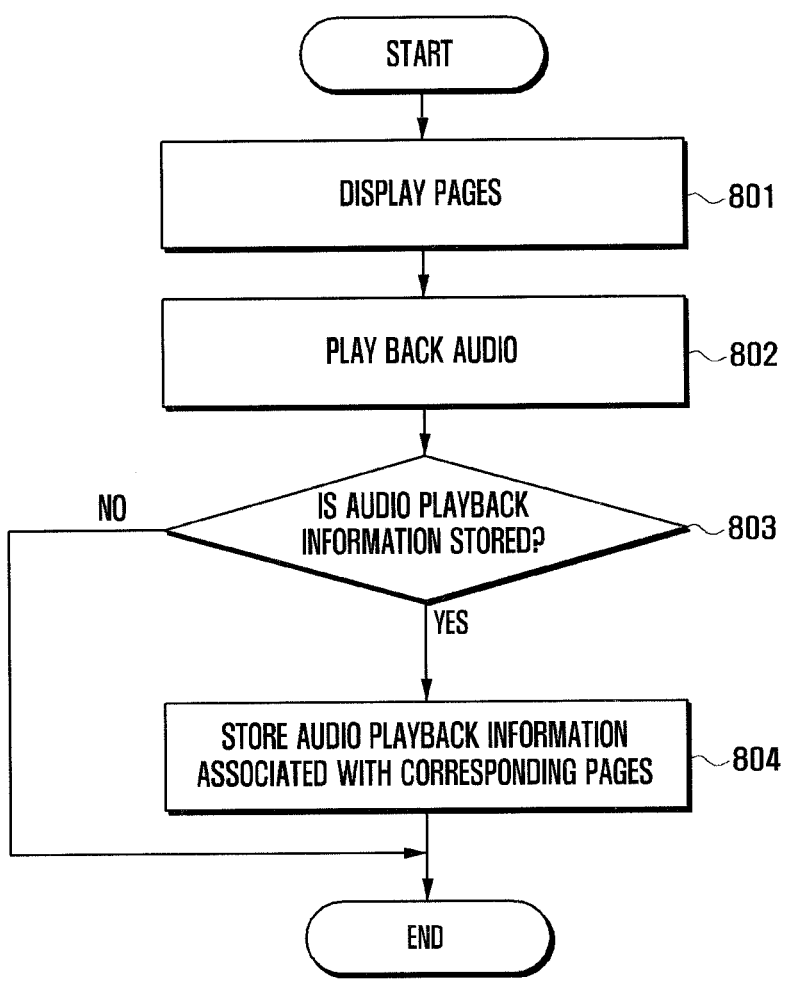
FIG. 8 illustrates a flow chart describing a method for storing audio playback information associated with pages, according to an exemplary embodiment of the present invention.
Figure 9:
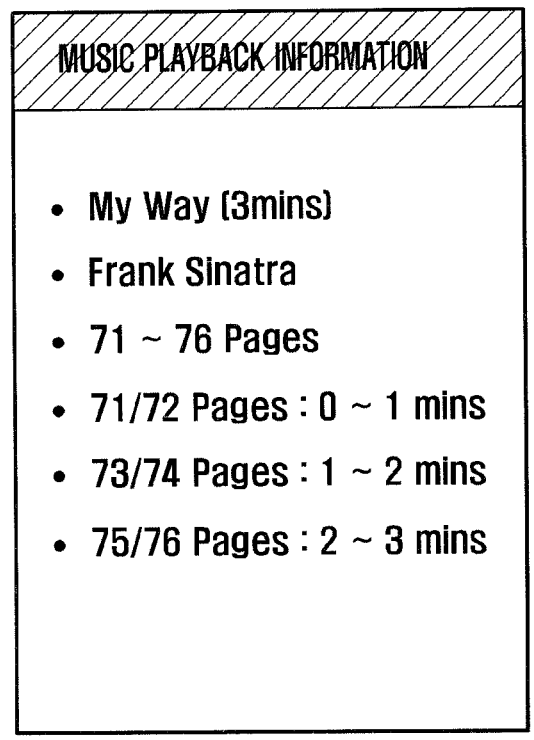
FIG. 9 illustrates a screen showing an example of stored audio playback information according to an exemplary embodiment of the present invention.

FIG. 8 illustrates a flow chart describing a method for storing audio playback information associated with pages, according to an exemplary embodiment of the present invention. FIG. 9 illustrates a screen showing an example of stored audio playback information according to an exemplary embodiment of the present invention.

Referring to FIG. 8, the controller 190 executes an e-book application and controls the display unit 112 to display the pages in step 801. According to an exemplary embodiment of the invention, the mobile device 100 can simultaneously execute multiple tasks. The controller 190 plays back music according to a user's request while executing the e-book application in step 802. Playing back music during the execution of an e-book application may be achieved via a variety of modes. For example, the controller 190 may detect a touch gesture for executing an audio player on the touch screen 110. The controller 190 displays the audio player execution screen, superimposed on pages of an e-book on the touch screen 110. The controller 190 plays back music according to a touch gesture applied to the audio player execution screen.

Although the exemplary embodiment is implemented in such a way that the controller 190 controls the display unit 112 to display a first screen (e.g., an audio player execution screen as described above), superimposed on a second screen (e.g., an e-book application execution screen described above), it may be modified in such a way that the controller 190 divides the area of the touch into two sub-areas and controls the display unit 112 to display an e-book application execution screen on one sub-area and an audio player execution screen (e.g., MP3 player) on the other sub-area. Alternatively, the controller 190 controls the display unit 112 to display the full screen, switching between an e-book application execution screen mode and an audio player execution screen mode (MP3 player), according to a touch gesture for switching the screens. In addition, the e-book application may play back. In another exemplary embodiment, the e-book application may be executed while music has been being played back. To this end, an audio player may be executed prior to the e-book application. In that case, the exemplary embodiment omits step 802.

The controller 190 asks the user to determine whether the user stores the playback information regarding a piece of music in playback in step 803. If a type of audio feedback has been set to Music 513 as shown in FIG. 5B, the controller 190 stores the music playback information. Alternatively, the controller 190 may ask the user to determine whether the user stores the music playback information irrespective of whether a type of audio feedback has been set to Music 513. For example, a method for asking the user to determine whether the user stores the music playback information may be in such a way as to display a pop-up window for displaying the message, superimposed on pages of an e-book. The controller 190 may determine an option as to whether to store the music playback information, in response to a user's selection on the pop-up window. Asking the user whether the user stores the music playback information may be executed at a particular time. For example, the controller 190 may display a pop-up window asking the user whether the user stores information regarding a piece of music in playback when the piece of music starts playback while pages of an e-book is being displayed, when a page of an e-book is turned while the piece of music is being played back, when the display of pages of an e-book is terminated or the execution of an e-book is terminated while the piece of music is being played back.

If the controller 190 ascertains that the user executes to store the music playback information at step 803, the controller 190 stores the information associated with corresponding pages in the storage unit 140 in step 804. For example, as shown in FIG. 9, the controller 190 stores, in the storage unit 140, music playback information including the total running time of 3 minutes associated with Pages 71 to 76, Frank Sinatra as a singer, and the title of song 'My Way'. The playback section for Pages 71 to 72 is 0~1 minute on the timeline, the playback section for Pages 73 to 74 is 1~2 minute on the timeline, and the playback section for Pages 75 to 76 is 2~3 minute on the timeline. If Page 71 is displayed later, the controller 190 may automatically play back the playback section of 0~1 minute on the timeline corresponding thereto or the entire section of the song, without requiring an input for playing back the song 'My Way.' Alternatively, singer, playback time period, song title, and playback section of respective pages, from the music playback information, may be separately stored.

Figure 10:
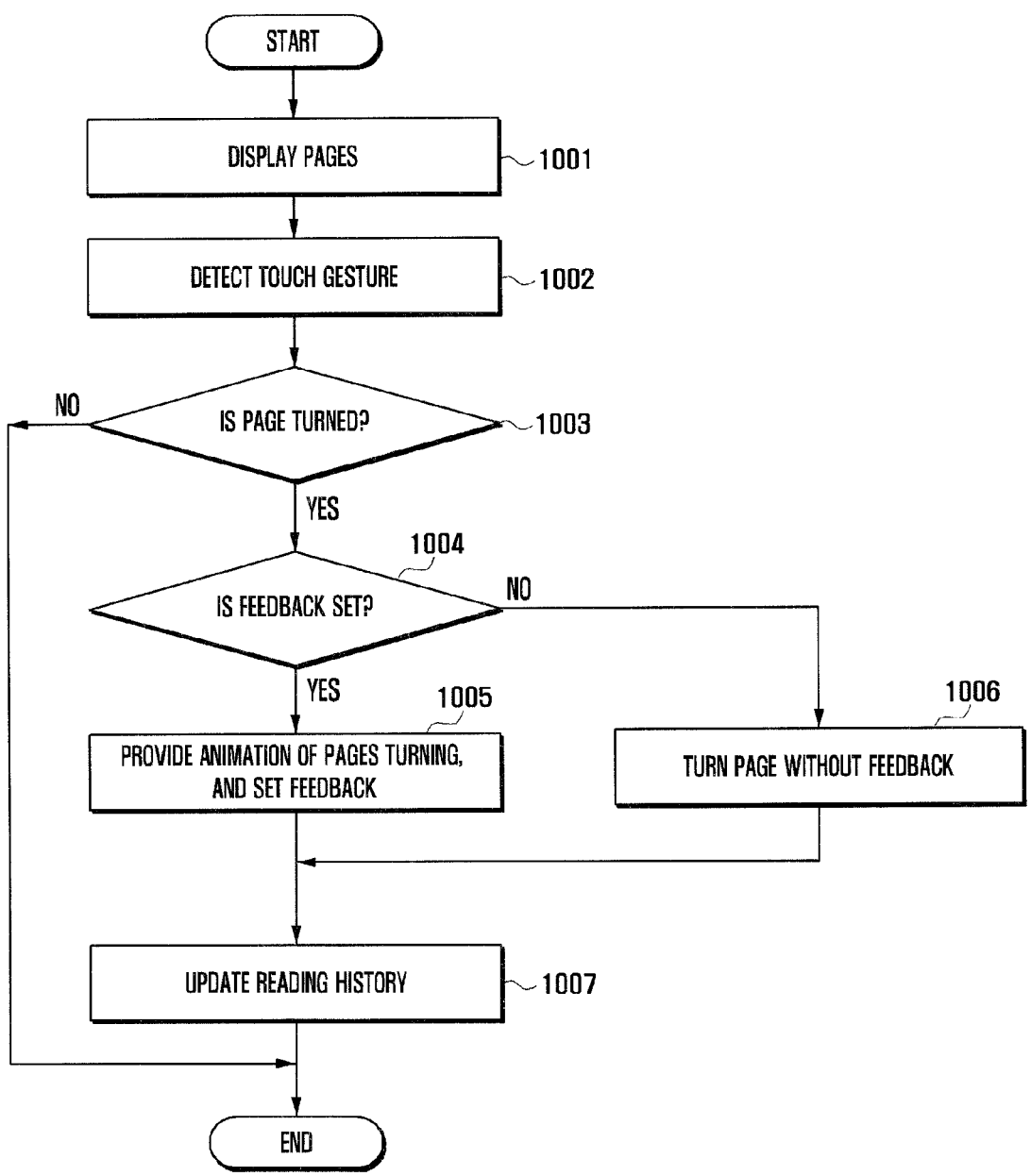
FIG. 10 illustrates a flowchart describing a method for providing feedback information, according to an exemplary embodiment of the present invention.

FIG. 10 illustrates a flowchart describing a method for providing feedback information, according to an exemplary embodiment of the present invention.

Referring to FIG. 10, the controller 190 executes an e-book application and controls the display unit 112 to display pages of an e-book in step 1001. The controller 190 detects a touch gesture on a page in step 1002. The controller 190 determines whether the detected touch gesture is to turn a page in step 1003. For example, if first and second pages of an e-book are displayed on the left and right areas on the screen and the controller 190 ascertains that the touch gesture is detected on the second page and removed from the first page, the controller 190 identifies the detected touch gesture as an action for turning the second page to the left.

After ascertaining that the detected touch gesture is to turn a page at step 1003, the controller 190 determines whether feedback has been set, referring to the feedback settings 143, in step 1004. If the controller 190 ascertains that feedback has been set at step 1004, the controller 190 provides an animation of pages turning and also the set type of feedback in step 1005. The controller 190 provides at least one of touch feedback, audio feedback, and visual feedback, based on history 142 and feedback settings 143. The controller 190 may provide feedback (e.g., vibration, sound effect, TTS, etc.) while turning pages or feedback (e.g., music playback) after pages have been turned. The controller 190 updates the history 142 in step 1007. For example, the controller 190 updates the turned pages as read pages. If the controller 190 ascertains that feedback hasn't been set at step 1004, the controller 190 provides an animation of pages turning without providing feedback in step 1006 and then proceeds with step 1007. If the controller 190 ascertaining that the detected touch gesture isn't an action for turning a page at step 1003, the controller 190 terminates the procedure for providing feedback information.

A detailed description of exemplary embodiments of the present invention is described below referring to the exemplary screens. The types of display modes for a screen are divided into a landscape mode and a portrait mode. The mobile device 100 displays two pages side by side in a landscape mode and one page in a portrait mode. It should be understood that exemplary embodiments of the present invention are not limited by the types of display modes. If the user orientates the mobile device 100, the sensing unit 185 detects the orientation and transfers the signal to the controller 190. In that case, the controller 190 determines the display mode, based on the signal of the detected orientation state.

FIGS. 11A to 11E, 12, and 13A to 13C illustrate screens describing a first embodiment of a feedback providing method according to an exemplary embodiment of the present invention.

Referring to FIGS. 11A to 11E, 12, and 13A to 13C, the controller 190 controls the display unit 112 to display one part and the other part of pages of an e-book side by side on the screen, and to deform them in protrudent form according to a touch gesture. The degree of deformation of pages may depend on information regarding touch gestures (e.g., a location where a touch is made on the page, the movement direction of a touch gesture, a movement distance of a touch gesture, a speed of a touch gesture, etc.). The controller 190 may provide visual feedback (to displaying pages in protrudent form), audio feedback, and touch feedback.

Figure 11A:
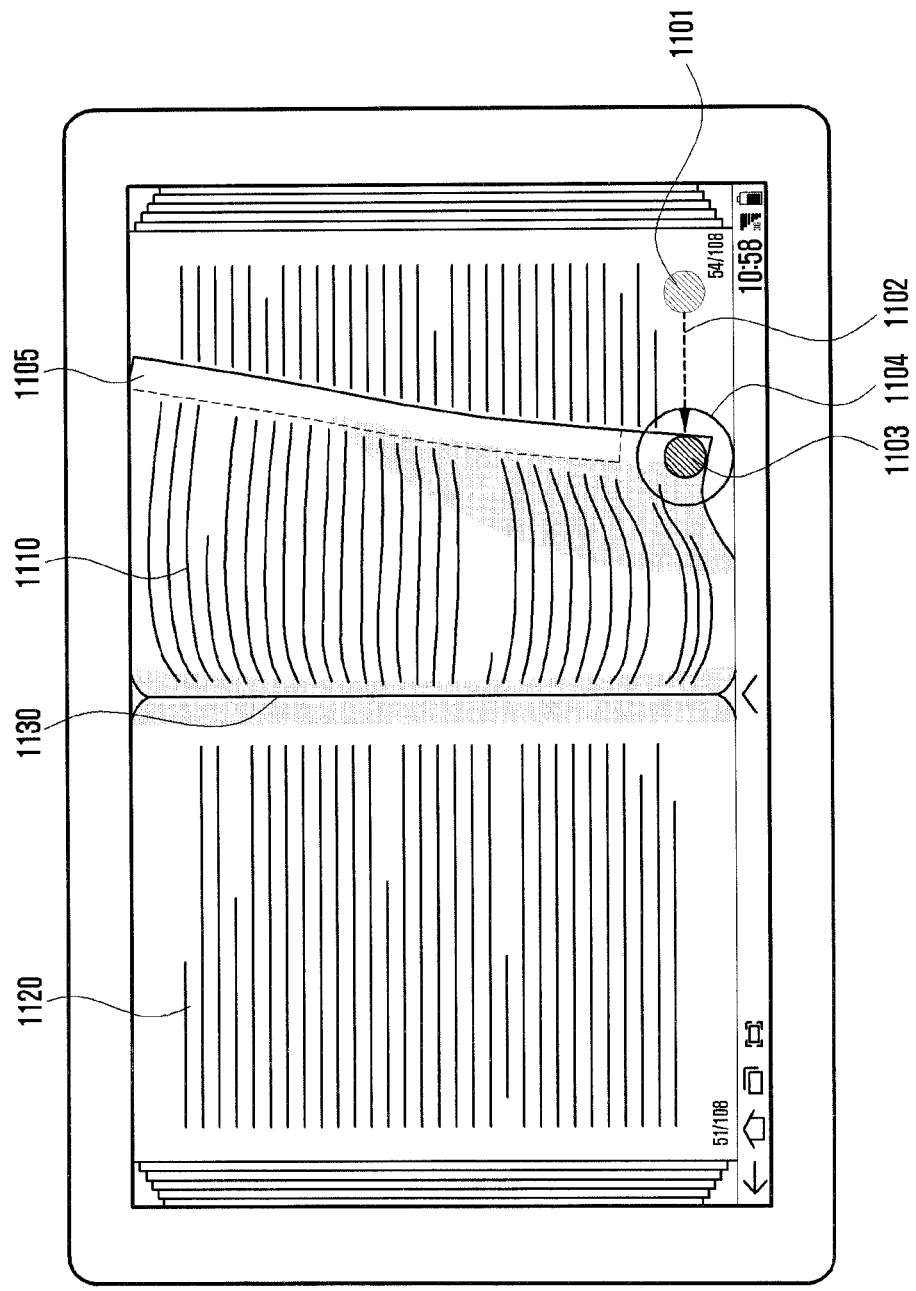

Referring to FIG. 11A, the user touches a first spot 1101 at the bottom right on the touch screen with a touch input tool. The controller 190 detects a target node corresponding to the first spot 1101. If the user moves the touch input tool contacting the first spot 1101 in the negative direction of the X-axis (i.e., to the bottom left on the touch screen), the controller 190 detects the touch gesture 1102 moving. In that case, the controller 190 provides touch feedback (e.g., vibration) according to the touch gesture 1102. For example, if a first page was set as a stiff type of paper like magazines, the controller 190 controls the vibration motor to create a relatively high level of vibration. If a first page was set as a thin type of paper like newspapers, the controller 190 controls the vibration motor to create a relatively low level of vibration. During the process, since the touch feedback may unnecessarily waste the energy of the battery, the period of time in execution needs to be restricted. The controller 190 may control the vibration motor to continue to generate vibration in response to the movement of the touch gesture. Alternatively, the vibration motor may control the vibration motor to generate vibration for only 1 second for example, after detecting the touch gesture 1102 moving.

The controller 190 moves the target node in the direction of the bottom left on the touch screen, in response to the touch gesture 1102. During the process, the controller 190 may move the target node in the direction perpendicular to the direction of the force of gravity. Alternatively, the controller 190 may move the target node in the direction of a preset angle (e.g., −30°~+30°) with respect to the direction of the force of gravity. The controller 190 calculates the displacements of the target nodes, i.e., the current locations of the target nodes, the speeds of the target nodes, the distances that the target nodes moved, and the movement directions of the target nodes. The controller 190 calculates the forces applied to the respective target nodes using the calculated displacements. The controller 190 calculates the locations of the respective target nodes using the calculated forces. The controller 190 creates an animation of the page using the calculated positions. The controller 190 controls the display unit 112 to display the created animation of the page turning.

FIG. 11A illustrates an animation of a page turning (a page deformed by turning) when a touch input tool is located at a first bottom margin spot 1103 in the bottom margin near the bottom edge while moving from a first spot 1101 at the bottom right to the bottom left. While the target nodes are moving from the first spot 1101 to the first bottom margin spot 1103, the first page 1110 is protrudently deformed. As shown in FIG. 11A, the corner 1104 where the target nodes are located closer to the gutter (spine) than the other edge area 1105. A second page 1120 of the e-book is displayed on the left area of the touch screen and the reference number 1130 refers to the gutter line between the two pages 1110 and 1120.

Referring to FIG. 11B, the user may continue to move the touch input tool in the direction of the bottom left corner from the first bottom margin spot 1103. The controller 190 detects the touch action 1106, creates the animation, and controls the display unit 112 to display the animation. FIG. 11B illustrates an animation of a page turning (a page deformed by turning) when a touch input tool is located at a second bottom margin spot 1107 near the bottom edge farther from the first bottom margin spot. Comparing FIGS. 11A and 11B, the pages 1110 are similar to each other in that they are protrudently deformed as a whole; however, the page shown in FIG. 11B is more protrudently deformed than that shown in FIG. 11A. Accordingly, if the user removes the touch from the page 1110 shown in FIG. 11B, the e-book is turned to the left part of the e-book. If the user removes the touch from the page 1110 shown in FIG. 11A, the e-book is not turned to the left part of the e-book. If the user removes the touch action from the first bottom margin spot 1103 as shown in FIG. 11A, the force of the deformed page (i.e., the center of gravity of the deformed page) acts toward the right, so that the page returns to the original place. If the user removes the touch action from the second bottom margin spot 1107 as shown in FIG. 11B, the force of the deformed page (i.e., the center of gravity of the deformed page) acts toward the left, so that the page is turned to the left part of the e-book including a second page shown in FIG. 11D. As described above, a determination as to whether a page is turned depends on whether the center of gravity of the page is located on pages of an e-book.

In addition, a determination as to whether a page is turned depends on the movement direction of a touch action. For example, referring to FIG. 11A, the controller 190 detects a touch gesture (touch action) 1102 moving and ascertains that the user removes the touch from the first bottom margin spot 1103. If the touch gesture 1102 has been moved in the direction to turn the first page 1110 immediately before the touch gesture 1102 is removed, the controller 190 may turn the e-book to the left part of the e-book including a second page 1120.

A determination as to whether a page is turned may depend on the speed of a touch action. For example, referring to FIG. 11A, if the user makes a touch action 1102, at 30 cm/sec corresponding to a flick action, with a touch input tool, the controller 190 may turn the first page 1110 to the left part of the e-book including a second page 1120.

A determination as to whether a page is turned may depend on the movement distance of a touch action. For example, referring to FIG. 11B, if the user moves a touch input tool from a first spot 1101 at the bottom right to a second bottom margin spot 1107 near the bottom edge, the controller 190 calculates the distance therebetween. If the controller 190 ascertains that the calculated distance is greater than a preset value (e.g., 70 mm), the controller 190 may turn the first page 1110 to the left part of the e-book including a second page 1120.

A determination as to whether a page is turned depends on the location where a touch is made. For example, referring to FIG. 11C, if the user first makes a touch at a spot on a first page 1110, moves the touch, and then removes the touch from a spot on the left part of the e-book including a second page 1120, the controller 190 may turn the first page 1110 to the left part of the e-book.

As described above, a determination as to whether a page is turned depends on whether the center of gravity of the page is located on pages of an e-book, the movement direction of a touch action, the movement distance of a touch action, or the location where a touch is made. The option to turn a page may be set according to the system manufacturers' settings or the user's settings.

If the controller 190 determines to turn the first page 1110, it may provide audio feedback associated with the page. For example, referring to FIGS. 11A to 11C, the controller 190 may provide a sound effect, TTS, music, an alarm sound, or the like, while turning the first page 1110. If there was no history associated with the first page 1110 or a type of audio feedback was not set, the controller 190 may not provide audio feedback. Since the methods for providing audio feedback, a sound effect, TTS, music, and an alarm sound were described above referring to FIGS. 1 to 10, a detailed description is omitted.

Figure 11D:
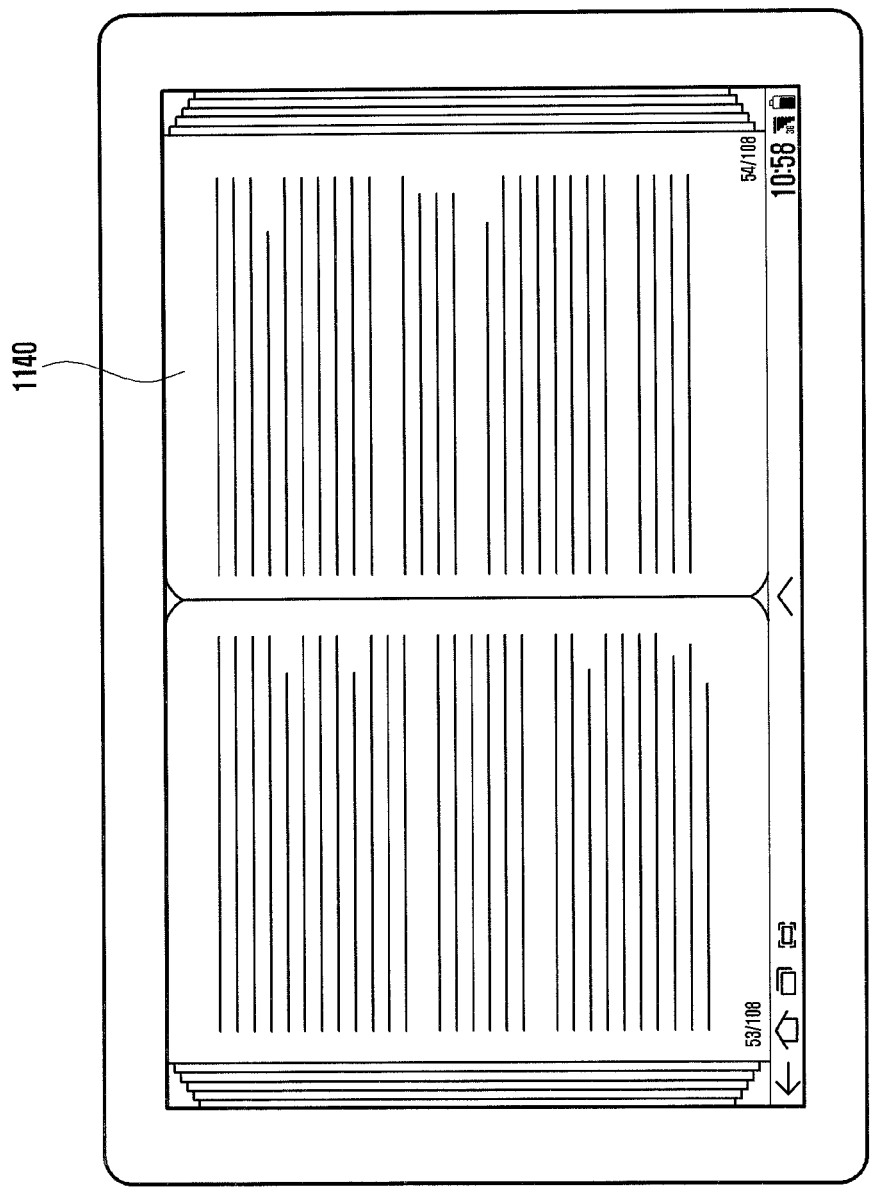

Referring to FIG. 11D, if the first page 1110 is turned to the left part of the e-book, a third page 1140 appears on the right part of the e-book. If the third page 1140 is associated with music, it may be displayed with the playback of the piece of music. If there was no audio playback information 142b associated with the third page 1140 or a type of audio feedback was not set to music playback, the controller 190 may not perform music playback. Since the method for playing back music was described above referring to FIGS. 1 to 10, a detailed description is omitted.

Referring to FIGS. 11C and 11D, the user may further move the touch input tool in the left from the second bottom margin spot 1107 without losing the contact. The user may move the touch input tool across the gutter 1130 to a third bottom margin spot 1108 near the bottom edge. In that case, the controller 190 may control the display unit 112 to display part of the next page (e.g., Page 53). If the user removes the touch action from the third bottom margin spot 1108, the controller 190 turns the first page 1110 to the left part of the e-book and controls the display unit 112 to display the next page (e.g., Page 53) as shown in FIG. 11D. Meanwhile, although the user does not move the touch input tool across the gutter 1130, the controller 190 may control the display unit 112 to display part of the back of the page that is currently displayed. For example, if the user moves a touch input tool to a preset range of value (e.g., 10 mm) apart from the gutter 1130, the controller 190 may control the display unit 112 to display part of the next page. It should be understood that the preset range of value may be set to values other than 10 mm.

The controller 190 may control the display unit 112 to display a audio feedback window corresponding to a type of audio feedback on pages of an e-book (e.g., in a margin of a page or on the extension line from the direction to which a touch action moves). For example, referring to FIG. 11C, the controller 190 controls the display unit 112 to display a audio feedback window 1190 in the top margin of the second page 1120. When the user moves the touch action across the gutter 1130 from the first page 1110 to the second page 1120, the controller 190 controls the display unit 112 to display the audio feedback window 1190. Alternatively, if the controller 190 determines to turn a page (e.g., to turn a first page 1110 from the right part to the left part of the e-book), the controller 190 may control the display unit 112 to display the audio feedback window 1190. The audio feedback window 1190 shows a type of audio feedback that was set. For example, as shown in FIG. 11C, the controller 190 may display a sentence, "Playing back a voice memo" for example, on the audio feedback widow 1190. Alternatively, the controller 190 may display an icon representing a type of audio feedback, instead of the sentence. If music is being played back, the controller 190 may control the display unit 112 to display a sentence "Playing back music" or an icon representing the operation on the audio feedback window 1190. Likewise, if TTS is being executed, the controller 190 may control the display unit 112 to display "TTS" or an icon representing the operation on the audio feedback window 1190.

Referring to FIG. 11C, if a button 1141 for displaying details, e.g., 'More', is selected on the audio feedback window 1190, the controller 190 controls the display unit 112 to display the details of the type of audio feedback (e.g., a voice memo) on a separate pop-up window. The option as to whether the audio feedback window 1190 is displayed may be set according to the user's settings.

As shown in FIG. 11C, the audio feedback window 1190 may be displayed in the side margin 1150, or the bottom margin 1160. According to an exemplary embodiment of the present invention, margins of a page refer to areas (e.g., top, bottom, and side areas) where content (e.g., text) isn't located. The location to display the audio feedback window 1190 may be determined, considering at one of the location where a touch gesture is made, the movement direction of the touch gesture, and the speed of the touch gesture.

Figure 11E:
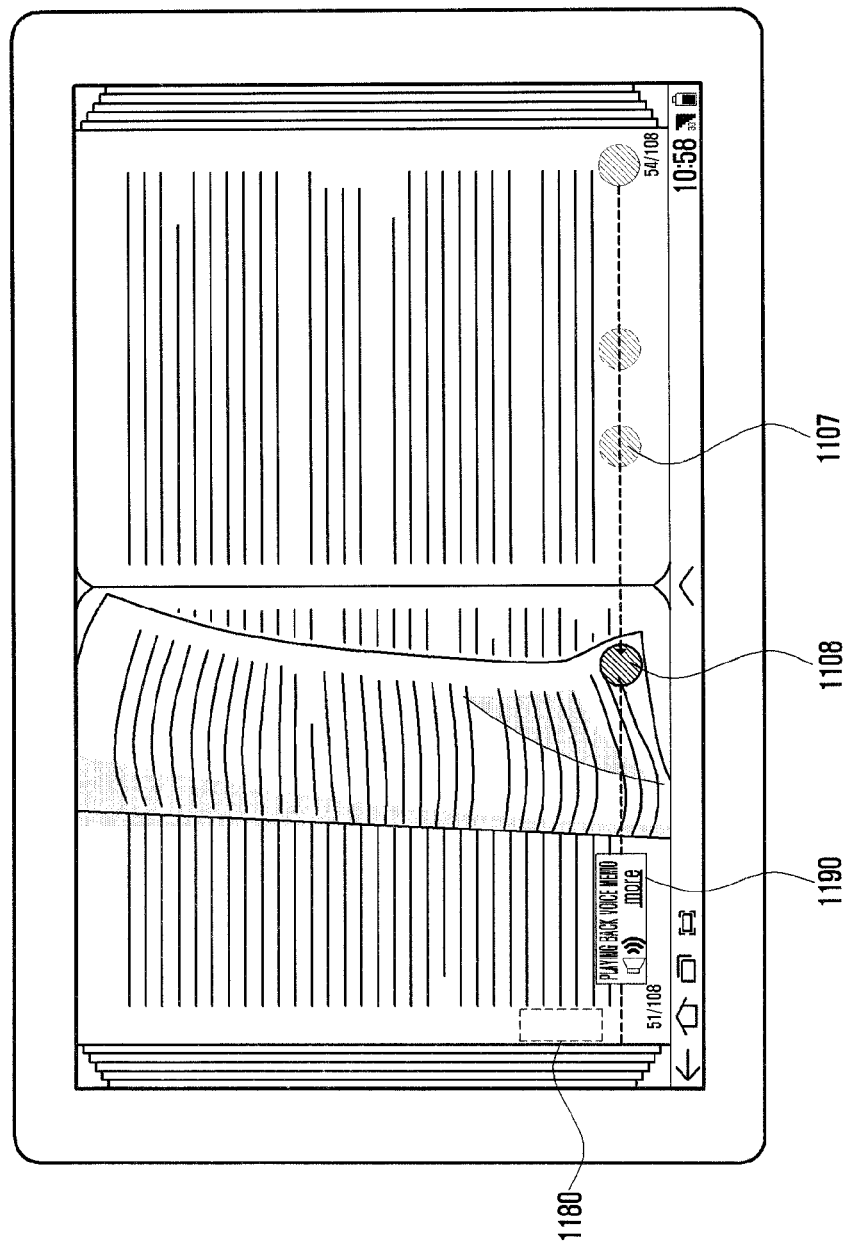

Referring to FIG. 11E, the controller 190 may control the display unit 112 to display the audio feedback window 1190 at a location adjacent to the extension line from the direction to which a touch action moves. According to an exemplary embodiment of the present invention, the location adjacent to the extension line is 30 mm apart from the extension line, up and down. Alternatively, the controller 190 may control the display unit 112 to display the audio feedback window 1190 at a margin 1180, close to the extension line from the direction to which a touch action moves.

Figure 12:
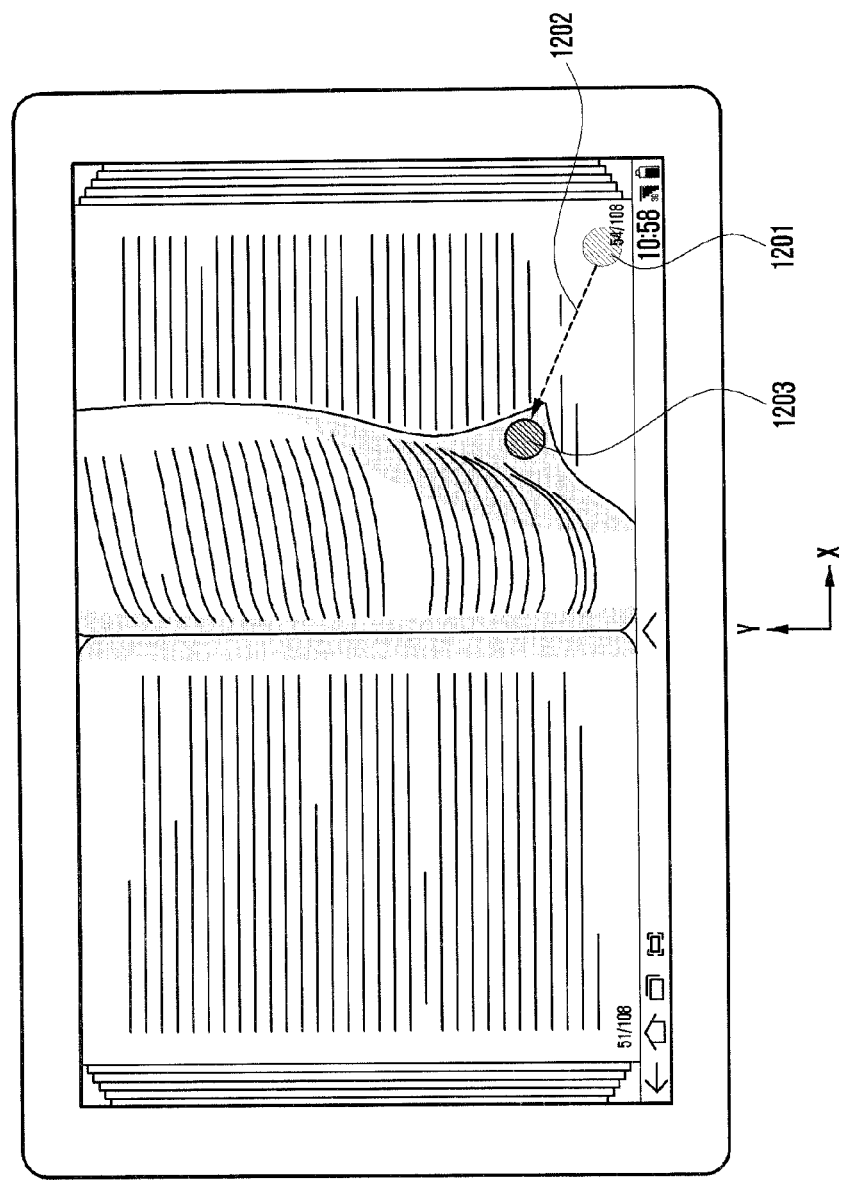

Referring to FIG. 12, the user touches a second spot 1201 at the bottom right on the touch screen with a touch input tool, and then moves the tool in the direction of top left therefrom without losing the contact. The controller 190 detects the touch action 1202 moving to the direction of top left. The controller 190 may provide touch feedback (e.g., vibration) in response to the touch action 1202, as described above. The controller 190 creates an animation of the page according to the touch action 1202 moving and controls the display unit 112 to display the animation. FIG. 12 illustrates a screen describing an animation of a page when a touch input tool starts moving from a second spot 1201 at the bottom right in the direction of top left and is located at a fourth spot 1203. In comparison with the exemplary embodiment shown in FIG. 11A and that shown in FIG. 12, the touch input tools move in the different directions on the touch screen, thereby altering the pages in different shapes.

Figure 13A:
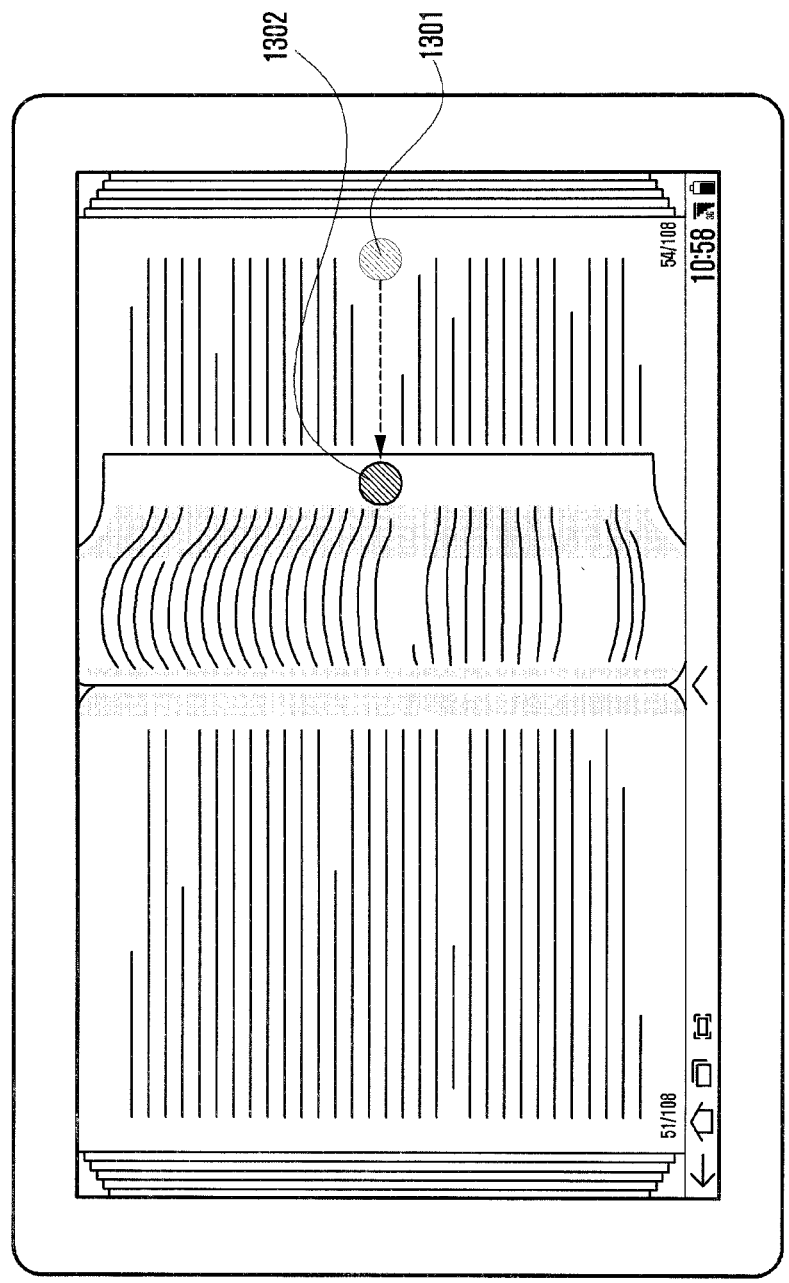
Figure 13B:
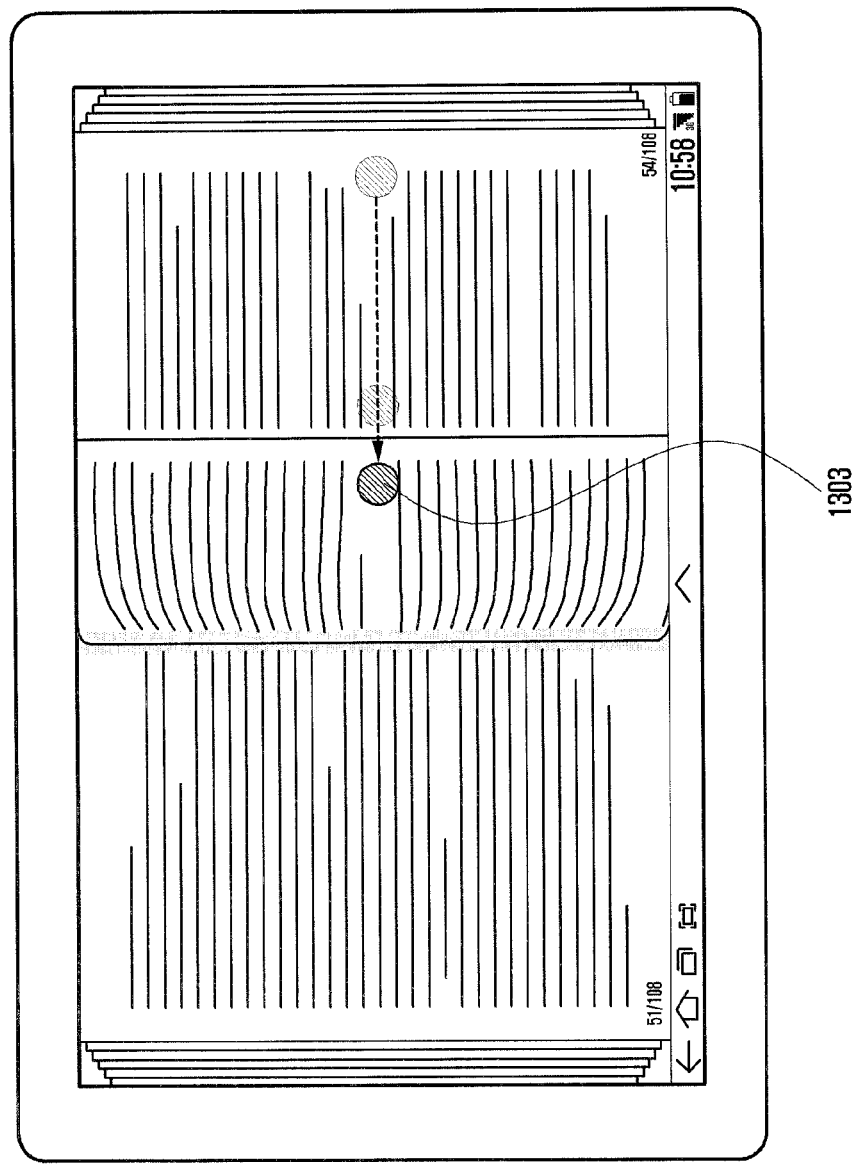

Referring to FIGS. 13A and 13B, the user touches a spot 1301 at the right margin on the right part of an e-book on the touch screen, with a touch input tool, and then moves the tool to the left part, or in the left direction. FIG. 13A illustrates a screen describing an animation of a page when a touch input tool starts moving from a right margin spot 1301 at the right margin to the left part of an e-book and is located at a first center spot 1302 on the right part of the e-book. As shown in FIG. 13A, when the user touches the right margin spot 1301 in the middle of the height of an e-book, with a touch input tool, and then moves to the left, the controller 190 controls the display unit 112 to display the page in a symmetrical shape with respect to the width direction at the middle of the height of the e-book. In addition, if the user further move the touch input tool toward the left part of the e-book from the first center spot 1302, FIG. 13B shows an animation of a page where a touch input tool is located at a second center spot 1303 farther apart from the first center spot 1302. In comparison with the page shown in FIG. 13A and that shown in FIG. 13B, the pages are protrudently deformed as a whole; however, the page shown in FIG. 13B is more protrudently deformed than that shown in FIG. 13A. In comparison with the exemplary embodiment shown in FIG. 11A and that shown in FIG. 13A, the touch input tools touch the different spots in terms of a first touch point on the touch screen, thereby altering the pages in different shapes.

Figure 13C:
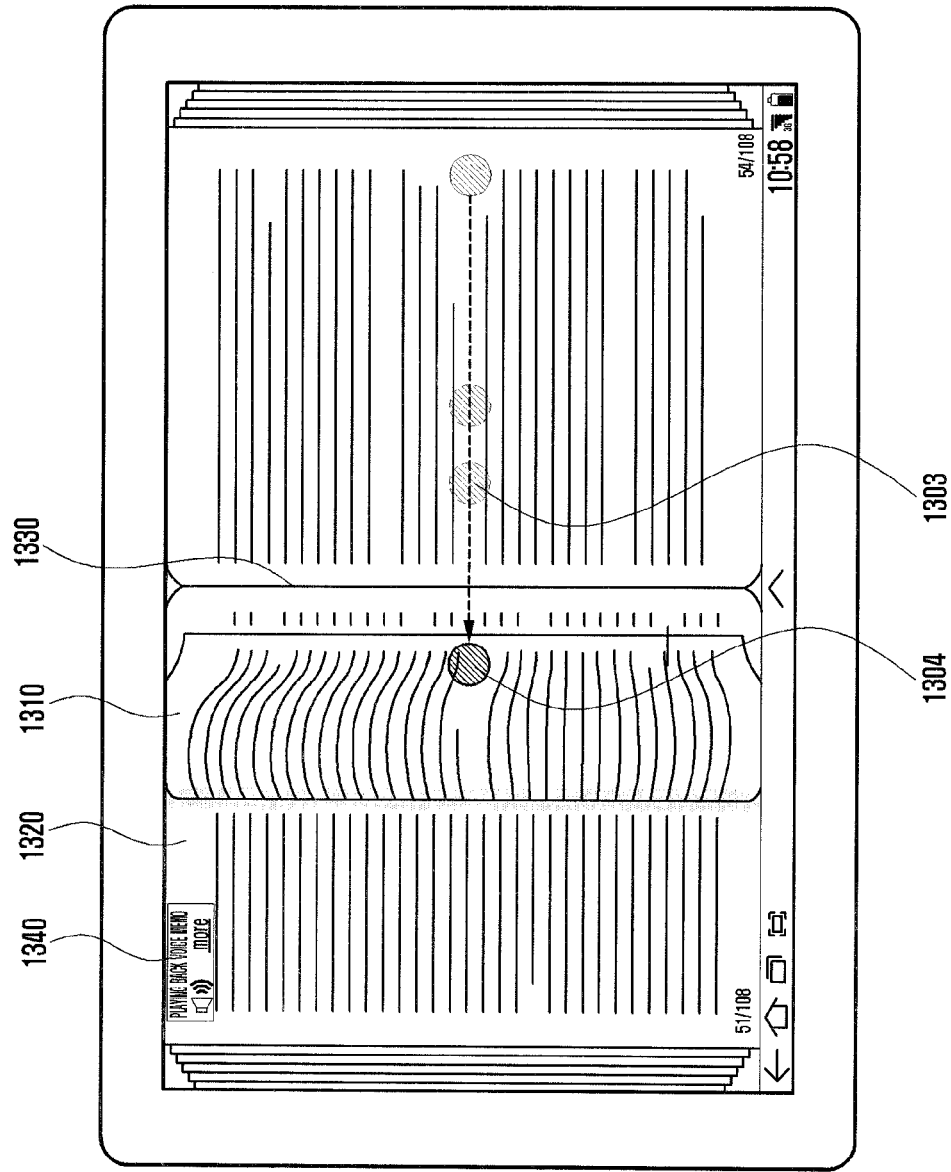

Referring to FIGS. 13B and 13C, the user may further move the touch input tool from the second center spot 1303, across the gutter 1330, to a third center spot 1304, without losing the contact. In that case, as shown in FIG. 13C, the controller 190 may control the display unit 112 to display part of the next page (e.g., Page 53). If the user removes the touch action from the third center spot 1304, the controller 190 turns the page to the left part of the e-book and controls the display unit 112 to display the next page. Meanwhile, although the user does not move the touch input tool across the gutter 1330, the controller 190 may control the display unit 112 to display part of the back of the page that is currently operated. If the controller 190 determines to turn the first page 1310, the controller 190 may provide audio feedback associated with the first page 1310. For example, the controller 190 may provide a sound effect, TTS, music, an alarm sound, or the like, while turning the first page 1310. Alternatively, the controller 190 may control the display unit 112 to display a audio feedback window corresponding to a type of audio feedback on pages of an e-book (e.g., in a margin of a page or on the extension line from the direction to which a touch action moves). For example, as shown in FIG. 13C, the controller 190 controls the display unit 112 to display an audio feedback window 1340 in the top margin of the second page 1320.

Figure 14A:
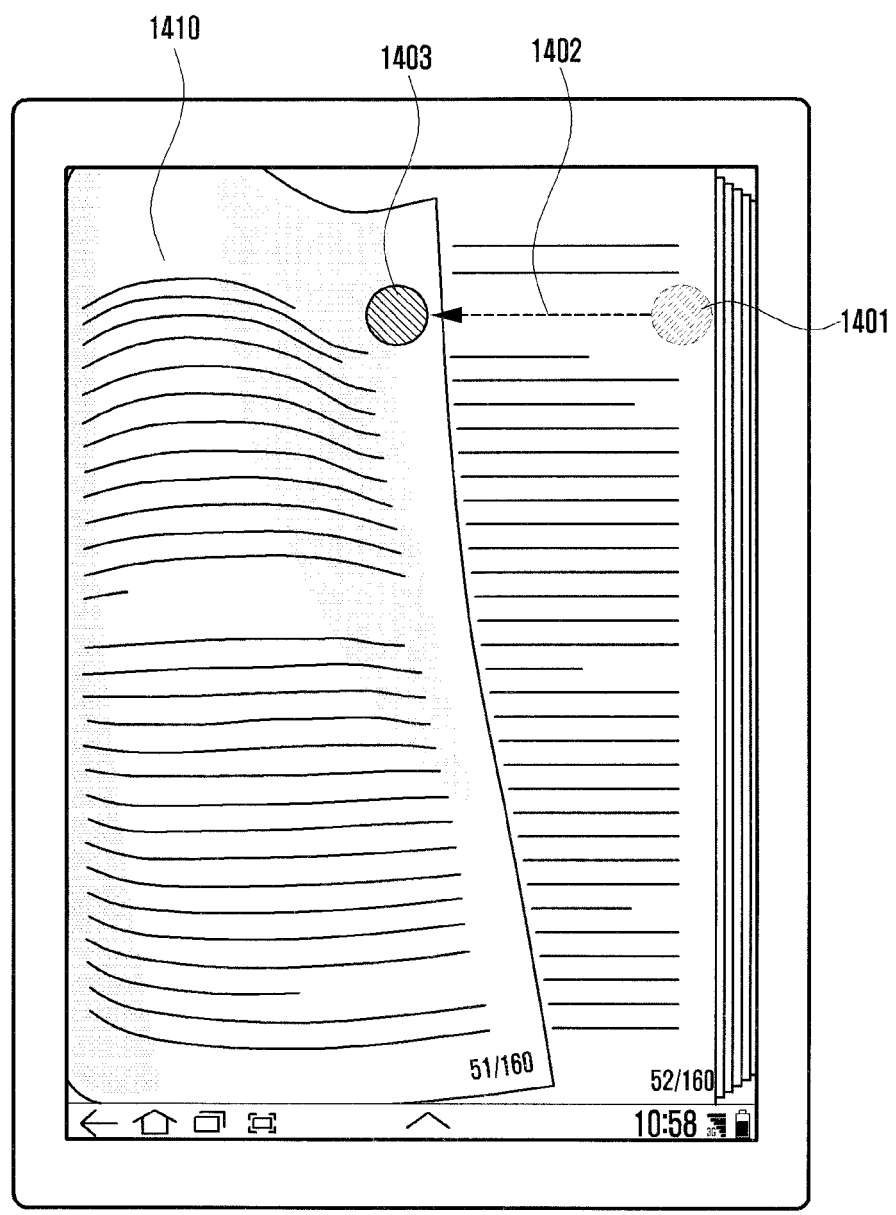
FIGS. 14A to 14C illustrate screens describing a second embodiment of a feedback providing method according to an exemplary embodiment of the present invention.
Figure 14B:
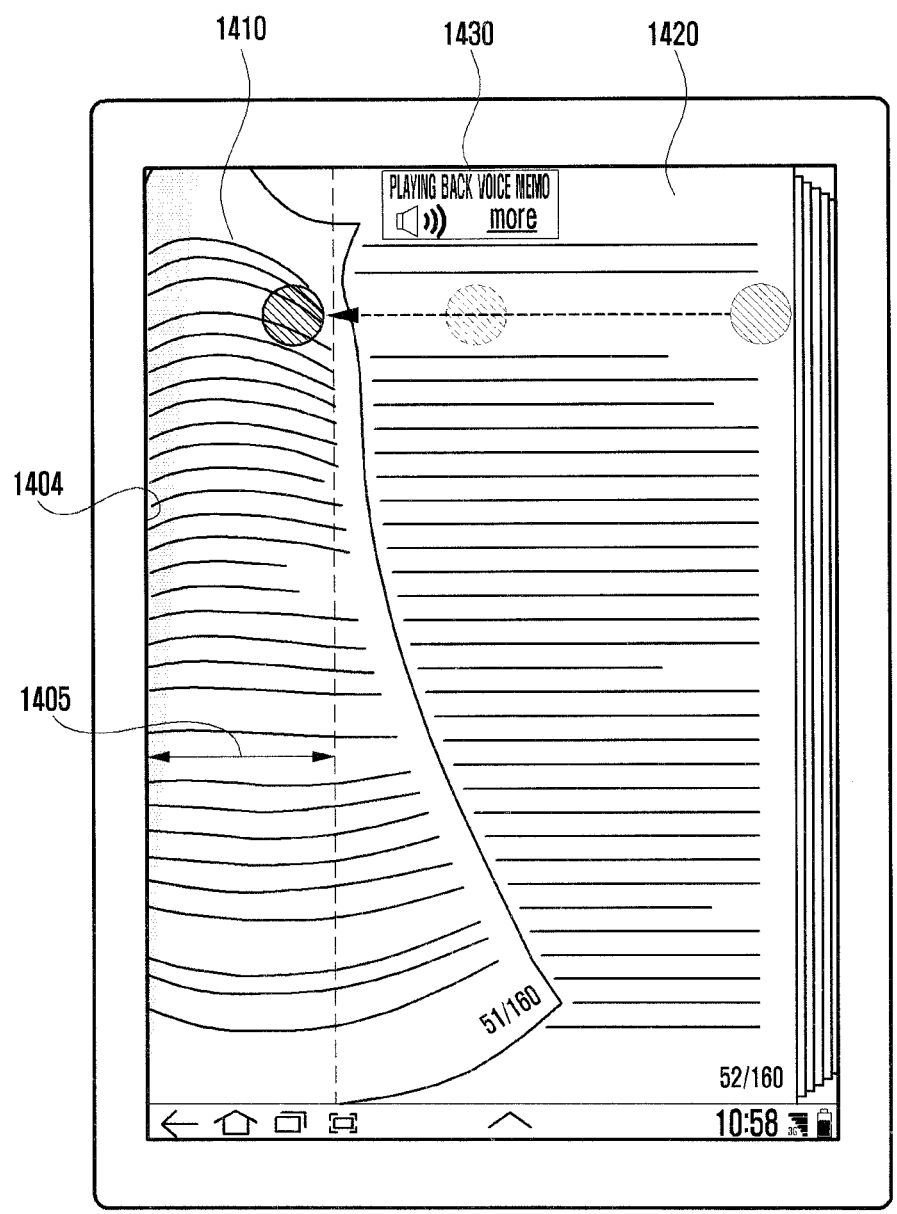
Figure 14C:
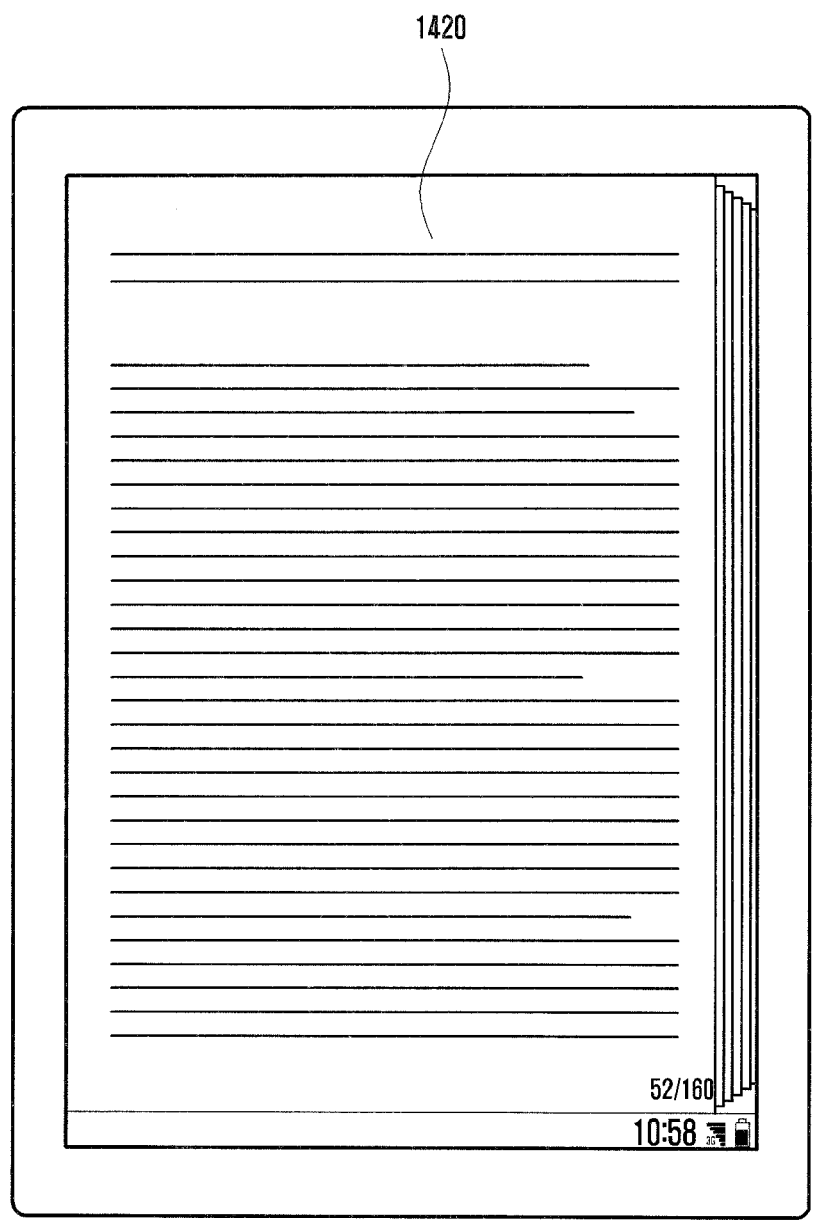

FIGS. 14A to 14C illustrate screens describing a second exemplary embodiment of a feedback providing method according to the invention.

Referring to FIGS. 14A to 14C, the controller 190 controls the display unit 112 to display one page on the screen and protrudently deforms the page in response to a touch gesture. The deformation degree of a page depends on the information regarding a touch gesture (e.g., the location where a touch gesture is made, the movement direction of a touch gesture, the movement distance of a touch gesture, the speed of a touch gesture, etc.). The controller 190 may provide audio feedback and touch feedback as well as sight feedback (e.g., to protrudently deform a page).

Referring to FIG. 14A, the user touches a spot 1401 at the top right on the touch screen with a touch input tool, and then moves the tool in the direction of the top left therefrom without losing contact. The controller 190 detects the touch action 1402 moving in the direction of the top left. The controller 190 may provide touch feedback (e.g., vibration) in response to the touch action 1402, as described above. The controller 190 protrudently deforms the first page 1410 according to the touch action 1402 and controls the display unit 112 to display the animation. FIG. 14A illustrates a screen describing an animation of a page when a touch input tool starts moving from a spot 1401 at the top right in the direction of top left and is located at a spot 1403 at the top margin spot.

If the user moves a touch input tool to the left edge 1404 of the touch screen within a preset value 1405 (e.g., 10 mm from the left edge 1404) as shown in FIG. 14B, the controller 190 may control the display unit 112 to turn the first page 1410 and display the next page (Page 52) as shown in FIG. 14C. It should be understood that the preset value may be set to values other than 10 mm. A determination as to whether a page is turned depends on the location where a touch is made. The exemplary embodiment shown in FIG. 14A differs from the exemplary embodiments shown in FIGS. 11A to 13C in that the exemplary embodiment shown in FIG. 14A displays each page on the screen, compared with the others that display two pages side by side on the screen. In addition, a determination as to whether a page is turned depends on whether the center of gravity of the page is located on the page of an e-book, the movement direction of a touch action, or the movement distance of a touch action.

If the controller 190 determines to turn the first page 1410, the controller 190 may provide audio feedback associated with the page. For example, referring to FIGS. 14A and 14B, the controller 190 may provide a sound effect, TTS, music, an alarm sound, or the like, while turning the first page 1410. If there was no history associated with the first page 1410 or a type of audio feedback was not set, the controller 190 may not provide audio feedback. Since the methods for providing audio feedback, a sound effect, TTS, music, and an alarm sound were described above referring to FIGS. 1 to 10, a detailed description is omitted. In addition, the controller 190 may control the display unit 112 to display an audio feedback window 1430 corresponding to a type of audio feedback on a page of an e-book (e.g., in a margin of a page or on the extension line from the direction to which a touch action moves). For example, referring to FIG. 14B, the controller 190 controls the display unit 112 to display the audio feedback window 1430 in the top margin of the second page 1420.

Referring to FIG. 14C, if the second page 1420 is newly displayed, the controller 190 may provide feedback associated with the page, e.g., to play back music. If there was no audio playback information associated with the page or a type of audio feedback, music playback, was not set, the controller 190 may not provide audio feedback. Since the methods for playing back music was described above referring to FIGS. 1 to 10, a detailed description is omitted.

As described above, the system and method for providing sensitive feedback and the mobile device adapted thereto, according to exemplary embodiments of the present invention, can provide audio feedback to a user when the user reads an e-book via the mobile device.

As described above, the feedback providing method according to exemplary embodiments of the present invention may be implemented with program commands that can be conducted via various types of computers and recorded in non-transitory computer-readable recording media. The computer-readable recording media contain program commands, data files, data structures, or the like, or a combination thereof. The program commands recorded in the recording media may be designed or configured to comply with the invention or may be software well-known to the ordinary person skilled in the art. The computer-readable recording media includes hardware systems for storing and conducting program commands. Examples of the hardware systems are magnetic media such as a hard disk, a floppy disk, a magnetic tape, optical media such as CD-ROM and DVD, Magneto-Optical Media, such as a floptical disk, ROM, RAM, flash memory, etc. The program commands include assembly language or machine code complied by a compiler and a higher level language interpreted by an interpreter. The hardware systems may be implemented with at least one software module to comply with the invention.

While the invention has been shown and described with reference to certain exemplary embodiments thereof, it will be understood by those skilled in the art that various changes in form and details may be made therein without departing from the spirit and scope of the of the invention as defined by the appended claims and their equivalents.

What is claimed is:

1. A method for providing feedback associated with pages of an e-book in a mobile device with a touch screen, the method comprising:

displaying a first page of the e-book on the touch screen;

detecting a first touch on the first page;

detecting a movement of the first touch; and providing visual feedback corresponding to properties set for a second page of the e-book and outputting audio feedback associated with the second page in response to displaying a portion of the second page according to the movement of the first touch.

2. The method of claim 1, wherein the outputting of the audio feedback comprises at least one of the following:

outputting the history, via Text To Speech (TTS) data;

outputting the history via a voice memo added to the second page; and playing back music corresponding to the second page, wherein the playing back of the music comprises playing back a section of or all of the music corresponding to the second page.

3. The method of claim 2, wherein the properties set for the second page of the e-book comprise at least one of a thickness, a weight, and a material of the second page.

4. The method of claim 1, further comprising:
providing touch feedback, in response to the movement of the first touch.

5. The method of claim 4, further comprising:
identifying a location of the first touch, a direction of the movement, and a speed of the movement; and
differently deforming each page of the e-book according to the location of the first touch, the direction of the movement, and the speed of the movement.

6. The method of claim 1, wherein the outputting of the audio feedback further comprises:
displaying an audio feedback window corresponding to a type of audio feedback on the second page.

7. The method of claim 6, wherein the audio feedback window is located in a margin of the second page or a location close to an extension line from a direction in which the first touch moves.

8. The method of claim 6, further comprising:
determining if a distance of the movement exceeds a threshold.

9. The method of claim 8, further comprising:
when the distance of the movement exceeds a threshold, determining that the movement corresponds to a page turning operation; and
in response to the determining of the page turning operation, removing the first page using an animation based on the movement and completely displaying the second page.

10. The method of claim 9, further comprising:
when music is associated with the second page and the second page is completely displayed, outputting the music; and
when an alarm sound is associated with the second page and the second page is completely displayed, outputting the alarm sound.

11. The method of claim 9, further comprising:
detecting a second touch on the second page;
determining a time difference between when the first touch is detected and when the second touch is detected; and
when the time difference is less than or equal to a preset period of time, determining that the second page is turned.

12. A method for providing feedback associated with pages of an e-book in a mobile device with a touch screen, the method comprising:
displaying a first page of the e-book on the touch screen;
while displaying the first page, outputting music from the mobile device;
while outputting the music, receiving a request for storing information indicating the music that is being played back while the first page is displayed;
storing the information associated with the first page, in response to the storage request; and
in response to a command to display the first page while a second page is being displayed, outputting the music and providing visual feedback corresponding to properties set for the first page.

13. The method of claim 12,
wherein the outputting of the music further comprises displaying, on the first page, an audio feedback window corresponding to the music that is being played back, and
wherein the properties set for the first page comprise at least one of thickness, weight, and material of the first page.

14. The method of claim 13, further comprising:
determining a time when the music is output,
wherein the time includes at least one of:
a time music starts to be played back while the page is being displayed;
a time the page is turned while the music is being played back;
a time when the display of the page is stopped while the music is being played back; and
a time when the execution of the e-book is terminated.

15. A method for providing feedback associated with pages of an e-book in a mobile device with a touch screen, the method comprising:
displaying a first page of the e-book on the touch screen;
when the first page is displayed, receiving information based on user input;
storing the information to be associated with the first page;
displaying a second page; and
in response to a page turning command to display the first page while the second page is being displayed, providing visual feedback and outputting audio feedback based on the information.

16. The method of claim 15, wherein the providing of the visual feedback and the outputting of the audio feedback comprises:
when the information comprises text, converting the text into voice data and outputting the voice data, and
when the information comprises properties set for the first page, providing the visual feedback corresponding to the properties.

17. A mobile device comprising:
a touch screen for displaying a first page of an e-book;
a storage unit for storing a history corresponding to at least one page of the e-book; and
a controller configured to:
detect a movement of a first touch on the displayed first page, and
provide visual feedback corresponding to properties set for a second page of the e-book and output audio feedback associated with the second page in response to displaying a portion of the second page according to the movement of the first touch.

18. The mobile device of claim 17, wherein the controller is further configured to perform at least one of:
outputting the history, via Text To Speech (TTS) data;
outputting the history via a voice memo added to the second page; and
playing back music corresponding to the second page,
wherein the properties set for the second page of the e-book comprise at least one of a thickness, a weight, and a material of the second page.

19. The mobile device of claim 17, wherein the controller is further configured to:
detect a location where the touch is made, a movement direction of the touch, and a speed of the touch, and
deform the first page according to the location where the touch is made, the movement direction of the touch, and the speed of the touch.

20. A non-transitory recordable medium, installed in a mobile device with a touch screen, storing a method for providing a feedback associated with pages of an e-book in the mobile device, the method comprising:
displaying a first page of an e-book on the touch screen;

detecting a first touch on the first page;
detecting a movement of the first touch; and
providing visual feedback corresponding to properties set for a second page of the e-book and outputting audio feedback associated with the second page in response to displaying a portion of the second page according to the movement of the first touch.

\* \* \* \* \*